(12) United States Patent
Sakurai et al.

(10) Patent No.: US 11,613,190 B2
(45) Date of Patent: Mar. 28, 2023

(54) HANDRAIL STRUCTURE

(71) Applicant: TOYOTA JIDOSHA KABUSHIKI KAISHA, Aichi-ken (JP)

(72) Inventors: Hideyuki Sakurai, Toyota (JP); Katsuya Shimazu, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 424 days.

(21) Appl. No.: 16/833,665

(22) Filed: Mar. 30, 2020

(65) Prior Publication Data
US 2020/0384902 A1 Dec. 10, 2020

(30) Foreign Application Priority Data

Jun. 10, 2019 (JP) .............................. JP2019-107941

(51) Int. Cl.
*B60N 2/75* (2018.01)
*B60Q 3/233* (2017.01)
*B60N 3/00* (2006.01)

(52) U.S. Cl.
CPC ............ *B60N 2/763* (2018.02); *B60N 3/001* (2013.01); *B60Q 3/233* (2017.02)

(58) Field of Classification Search
CPC .......... B60N 2/75; B60N 2/763; B60N 2/767; B60N 2/773; B60N 3/001; B60N 3/02; B60Q 3/233; B60Q 3/64
See application file for complete search history.

(56) References Cited

U.S. PATENT DOCUMENTS

| | | | | |
|---|---|---|---|---|
| 4,961,610 A | * | 10/1990 | Reeder | A47C 1/03 D6/716.2 |
| 6,086,156 A | * | 7/2000 | Breen | A47C 1/03 297/411.37 |
| 6,145,919 A | * | 11/2000 | Mysliwiec | B60N 2/78 296/153 |
| 6,290,300 B1 | * | 9/2001 | Sutton | A47C 1/03 297/411.37 |
| 6,974,134 B1 | * | 12/2005 | Macri | E05B 1/0015 16/412 |
| 7,114,774 B2 | * | 10/2006 | Stahel | B62J 1/28 297/188.15 |
| 7,384,092 B2 | * | 6/2008 | Hodges | B60N 2/78 296/153 |

(Continued)

FOREIGN PATENT DOCUMENTS

| | | |
|---|---|---|
| JP | H3-37028 U | 4/1991 |
| JP | H8-118958 A | 5/1996 |

(Continued)

*Primary Examiner* — James M Ference
(74) *Attorney, Agent, or Firm* — Hauptman Ham, LLP

(57) ABSTRACT

A handrail member is in a deployed state and at a so-called usable position when a tip portion of the handrail member is arranged between a sliding door and a lateral portion of a vehicle. Moreover, by making the handrail member usable, a passenger can place his or her hand on the handrail member when getting on or off the vehicle. As a result, it is possible to help the passenger get on/off the vehicle. In this manner, by turning the handrail member along a vehicle width direction around a bolt, the handrail member can be deployed and stored with a simple configuration.

15 Claims, 23 Drawing Sheets

(56) References Cited

U.S. PATENT DOCUMENTS

| | | | | |
|---|---|---|---|---|
| 7,452,032 | B1* | 11/2008 | Roleder | A61G 15/12 297/182 |
| 7,744,141 | B2* | 6/2010 | Saionji | B60N 3/023 49/461 |
| 7,896,425 | B2* | 3/2011 | Elliott | E05D 15/101 296/146.12 |
| 7,931,327 | B2* | 4/2011 | Ertl | B60J 5/106 296/146.12 |
| 8,020,923 | B2* | 9/2011 | Gaudig | B60J 5/06 296/153 |
| 8,162,379 | B2* | 4/2012 | Yano | E05D 15/50 296/146.12 |
| 8,297,684 | B1* | 10/2012 | Flamard | B60N 2/4235 296/153 |
| 8,403,398 | B2* | 3/2013 | Schulz | B60N 2/4235 296/153 |
| 8,419,124 | B2* | 4/2013 | Kramer | A61G 5/128 297/173 |
| 8,491,055 | B2* | 7/2013 | Freer, II | B60N 2/245 297/411.31 |
| 10,457,182 | B2* | 10/2019 | McKinnon | B60N 3/026 |
| 10,946,780 | B2* | 3/2021 | Bacon | E05B 1/0015 |
| 11,046,226 | B1* | 6/2021 | Younce | B60N 3/023 |
| 2006/0202541 | A1* | 9/2006 | Armo | B60N 2/777 297/411.35 |
| 2007/0204437 | A1* | 9/2007 | Hartmann | B60N 3/023 16/444 |
| 2010/0045067 | A1* | 2/2010 | Schulz | B60N 2/4235 296/153 |
| 2010/0045068 | A1* | 2/2010 | Gaudig | B60J 5/06 296/153 |
| 2011/0031785 | A1* | 2/2011 | Steenson | A47C 7/543 297/161 |
| 2011/0254312 | A1* | 10/2011 | Yano | E05D 15/50 296/146.13 |
| 2017/0182919 | A1* | 6/2017 | McKinnon | B60N 3/026 |
| 2018/0208089 | A1* | 7/2018 | Harris | B60N 2/793 |
| 2020/0114797 | A1* | 4/2020 | Sakurai | B60N 2/002 |
| 2020/0384902 | A1* | 12/2020 | Sakurai | B60N 2/773 |

FOREIGN PATENT DOCUMENTS

| | | |
|---|---|---|
| JP | H11-334446 A | 12/1999 |
| JP | 2009-227205 A | 10/2009 |
| JP | 2010-95024 A | 4/2010 |
| JP | 2010-155536 A | 7/2010 |
| JP | 2015101137 A | 6/2015 |
| JP | 2017-214043 A | 12/2017 |
| JP | 2018-69955 A | 5/2018 |

* cited by examiner

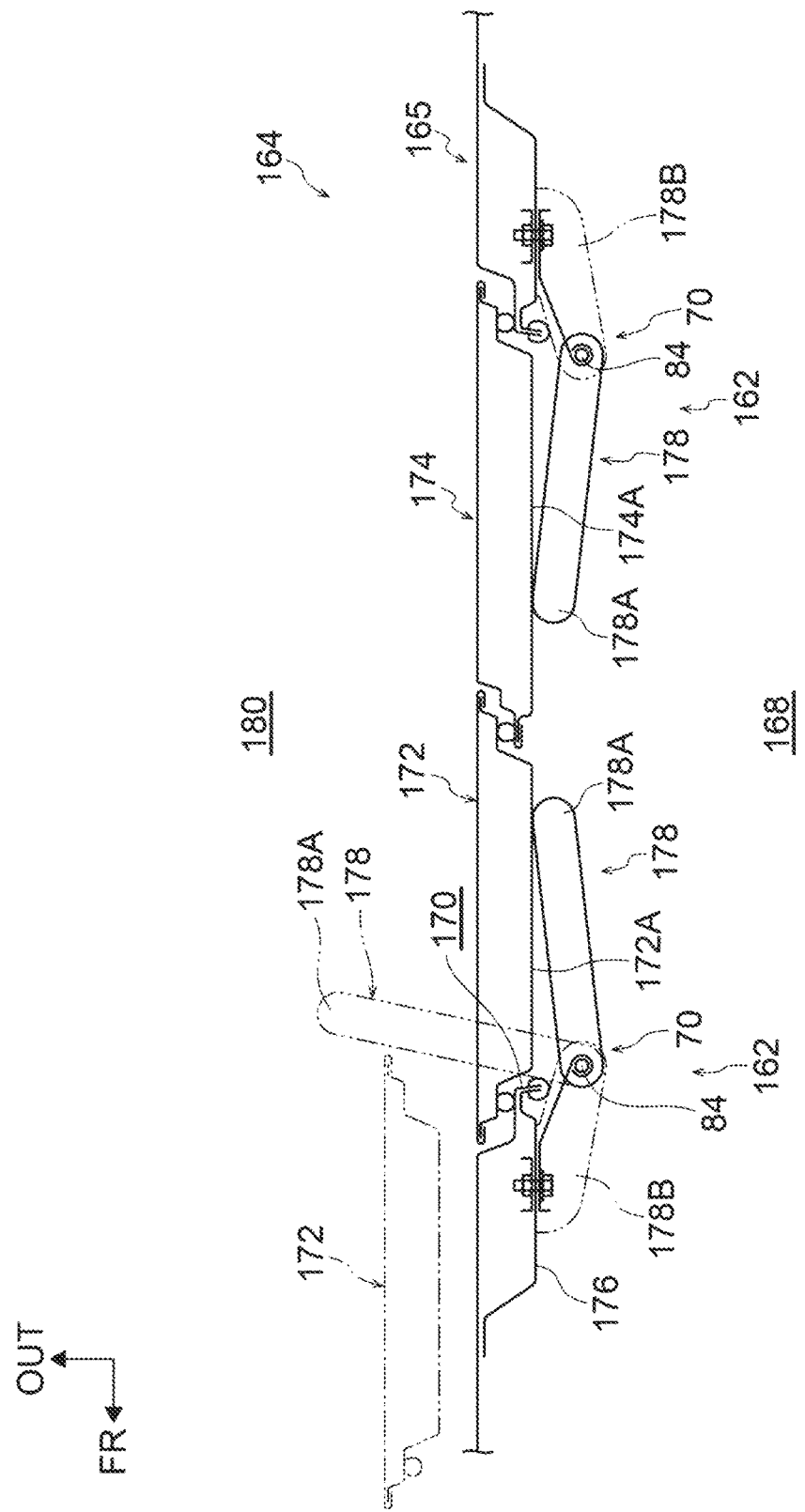

HANDRAIL STRUCTURE

INCORPORATION BY REFERENCE

The disclosure of Japanese Patent Application No. 2019-107941 filed on Jun. 10, 2019 including the specification, drawings and abstract is incorporated herein by reference in its entirety.

BACKGROUND

1. Technical Field

The present disclosure relates to a handrail structure.

2. Description of Related Art

In Japanese Patent Application Publication No. 2018-069955 (JP 2018-069955 A), there is disclosed an art regarding a vehicle grip (a handrail member) attached along a vehicle vertical direction to a lateral surface portion of a seatback constituting an upper portion of a vehicle seat. In this related art, a grip tip provided at an upper end of the vehicle grip (a free end portion of the handrail member) is set in such a manner as to rotate outward in a vehicle width direction from above, around a rotational fulcrum portion whose axial centerline coincides with a line extending along a vehicle longitudinal direction, and protrude outward in the vehicle width direction.

SUMMARY

In this related art, however, the vehicle grip rotates along the vehicle width direction around the rotational fulcrum portion whose axial centerline coincides with the line extending along the vehicle longitudinal direction, as described previously. Therefore, when the vehicle seat and a door opening of a side door are in a certain positional relationship, the vehicle grip interferes with a peripheral portion of the door opening, which may make it impossible to protrude the grip tip outward in the vehicle width direction.

In view of the aforementioned fact, the present disclosure aims at obtaining a handrail structure capable of protruding a free end portion of a handrail member outward in a vehicle width direction when a side door is opened.

First aspect of a handrail structure has a handrail member and a turning support portion. The handrail member is provided along a vehicle longitudinal direction, on a vehicle cabin interior side of a vehicle lateral portion or on a vehicle seat, with a side door provided at the vehicle lateral portion and arranged, in an open state thereof, more outward in a vehicle width direction than the vehicle lateral portion. The turning support portion turnably supports the handrail member in such a direction as to protrude outward in the vehicle width direction, turns the handrail member, which is pushed by the side door, toward the vehicle cabin interior side when the side door is closed up, and turns the handrail member in such a direction that a free end portion of the handrail member protrudes more outward in the vehicle width direction than the vehicle cabin with the side door open.

In the handrail structure according to the first aspect, the side door is arranged more outward in the vehicle width direction than the vehicle lateral portion, with the side door provided at the vehicle lateral portion open. Besides, the handrail member is provided along the vehicle longitudinal direction, on the vehicle cabin interior side of the vehicle lateral portion or on the vehicle seat. The handrail member is turnably supported in such a direction as to protrude outward in the vehicle width direction, by the turning support portion.

When the side door is closed up, the handrail member is arranged on the vehicle cabin interior side around the turning support portion, by being pushed by the side door. Thus, the handrail member is arranged along the vehicle longitudinal direction. That is, the handrail member is in a stored state and at a so-called reference position, when being arranged on the vehicle cabin interior side along the vehicle longitudinal direction.

On the other hand, the handrail member can turn in such a direction that the free end portion of the handrail member protrudes outward in the vehicle width direction, around the turning support unit, with the side door open. That is, the handrail member is in a deployed state and at a so-called usable position, when the free end portion of the handrail member protrudes more outward in the vehicle width direction than the vehicle cabin.

In this manner, by making the handrail member usable, the passenger can place his or her hand on the handrail member in getting on or off the vehicle. As a result, it is possible to help the passenger get on/off the vehicle.

As described above, in the first aspect, the free end portion of the handrail member, which is arranged along the vehicle longitudinal direction with the side door closed up, protrudes outward in the vehicle width direction with the side door open. That is, the free end portion of the handrail member turns along the vehicle width direction around the turning support portion. Moreover, when the side door is closed up, the handrail member is automatically arranged on the vehicle cabin interior side by being pushed by the side door.

Then, in the first aspect, by turning the handrail member around the turning support portion along the vehicle width direction, the tip portion of the handrail member can be protruded outward in the vehicle width direction, even if the side door and the tip portion of the handrail member overlap with each other with the side door open.

Incidentally, "the vehicle" mentioned herein includes a bus, a train and the like as well as an automobile. Besides, "the vehicle cabin interior side of the vehicle lateral portion" includes a vehicle cabin interior side of a lateral pillar, a wall portion or the like of a train, as well as the vehicle cabin interior side of the pillar of the automobile that constitutes part of a vehicle skeleton disposed along a vehicle vertical direction.

Besides, "the vehicle seat" includes a seatback that supports an upper body of the passenger, an armrest, and the like. In the case of the armrest, the handrail member according to the first aspect is applied instead of the armrest that is provided in advance on the vehicle seat or the like.

Furthermore, "the side door" includes a so-called swing door that turns along the vehicle width direction with the vehicle lateral portion serving as a turning center, as well as a so-called sliding door that moves along the vehicle longitudinal direction.

Besides, the expression "can be protruded" includes a case where the handrail member is manually protruded outward in the vehicle width direction after the side door is opened, as well as a case where the handrail member is automatically protruded outward in the vehicle width direction as soon as the side door is opened.

A second aspect of a handrail structure is obtained by modifying the handrail structure according to the first as follows. That is, the turning support portion is provided with an urging member that urges the handrail member outward in the vehicle width direction.

In the handrail structure according to the second aspect, the turning support portion is provided with the urging member that urges the handrail member outward in the vehicle width direction. Thus, the handrail member can be automatically protruded outward in the vehicle width direction due to an urging force of the urging member as soon as the side door is opened.

Then, when the side door is closed up, the handrail member is pressed by the side door. At this time, the urging member is pressed in such a direction as to resist the urging force of the urging member, via the handrail member. Elastic energy is accumulated in the urging member.

A third aspect of a handrail structure is obtained by modifying the handrail structure according to the first or second aspect as follows. That is, the handrail member can also serve as an armrest that supports an elbow of a sitting passenger who sits in the vehicle seat, with the side door closed up.

In the handrail structure according to the third aspect, the handrail member is made to serve also as the armrest that supports the elbow of the sitting passenger who sits in the vehicle seat, with the side door closed up. Thus, there is no need to provide the armrest and the handrail member separately from each other. Therefore, in the third aspect, the cost can be made lower than in the case where the armrest and the handrail member are provided separately from each other.

A fourth aspect of a handrail structure is obtained by modifying the handrail structure according to any one of first to third aspect as follows. That is, the free end portion of the handrail member is arranged between the side door and the vehicle lateral portion in the vehicle width direction, with the side door open, and with the free end portion of the handrail member protruding more outward in the vehicle width direction than the vehicle cabin.

In the handrail structure according to the fourth aspect, the free end portion of the handrail member is arranged between the side door and the vehicle lateral portion in the vehicle width direction, with the side door open, and with the free end portion of the handrail member protruding more outward in the vehicle width direction than the vehicle cabin. In other words, in the fourth aspect, the handrail member does not protrude more outward in the vehicle width direction than the side door, with the side door open.

Accordingly, the handrail member can be used inside the side door in the vehicle width direction, with the side door open. In this manner, it becomes possible to safely help the passenger who gets on or off the vehicle with his or her hand placed on the handrail member, by preventing the handrail member from protruding from outside the side door in the vehicle width direction, with the side door open.

A fifth aspect of a handrail structure is obtained by modifying the handrail structure according to any one of first to fourth aspect as follows. That is, the handrail member turns along a horizontal direction around the turning support portion.

In the handrail structure according to the fifth aspect, the handrail member turns along the horizontal direction around the turning support portion. Therefore, the tip portion of the handrail member can be protruded outward in the vehicle width direction, even if the side door and the tip portion of the handrail member overlap with each other in a lateral view of the vehicle, with the side door open.

Incidentally, "the horizontal direction" mentioned herein should not necessarily be the completely horizontal direction, but means "the substantially horizontal direction", and includes a range that is permitted in advance as a manufacturing error or the like.

A sixth aspect of a handrail structure is obtained by modifying the handrail structure according to any one of first to fifth aspect as follows. That is, the side door is provided with a support portion that supports the free end portion of the handrail member, with the side door open, and with the handrail member protruding outward in the vehicle width direction.

In the handrail structure according to the sixth aspect, the side door is provided with the support portion that supports the free end portion of the handrail member with the side door open, and with the handrail member protruding outward in the vehicle width direction. In this manner, the free end portion of the handrail member is supported by the support portion that is provided on the side door, with the handrail member protruding outward in the vehicle width direction. Therefore, the handrail member is not supported in a cantilever manner.

Accordingly, there is less need to enhance the rigidity so that the rigidity necessary for cantilever support is obtained, on the turning support portion side of the handrail member, than in the case where the handrail member is supported in a cantilever manner. As a result, the cost can be reduced correspondingly.

A seventh aspect of a handrail structure is obtained by modifying the handrail structure according to any one of first to sixth aspect as follows. That is, a recess portion that is recessed outward in the vehicle width direction, that accommodates the free end portion of the handrail member with the side door closed up, and that keeps the free end portion of the handrail member from moving in a vehicle vertical direction is formed in the side door.

In the handrail structure according to the seventh aspect, the side door is provided with the recess portion that is recessed outward in the vehicle width direction. The free end portion of the handrail member is accommodated in this recess portion, with the side door closed up. The recess portion is set in such a manner as to keep the free end portion of the handrail member from moving in the vehicle vertical direction. In this manner, the handrail member is kept from moving in the vehicle vertical direction, so the handrail member is supported in a stable state, and can be made to serve also as an armrest.

A eighth aspect of a handrail structure is obtained by modifying the handrail structure according to any one of first to seventh aspect as follows. That is, the handrail member is further equipped with an elongated portion that can be elongated along a length direction of the handrail member.

In the handrail structure according to the eighth aspect, the handrail member is equipped with the elongated portion that can be elongated along the length direction. Therefore, the length of the handrail member can be adjusted, which is convenient.

A ninth aspect of a handrail structure is obtained by modifying the handrail structure according to any one of first to seventh as follows. That is, the handrail member is configured to further include an accommodation portion, and a foldable table that can be accommodated in the accommodation portion.

In the handrail structure according to the ninth aspect, the handrail member is configured to further include the accommodation portion and the foldable table. The fordable table can be accommodated in the accommodation portion provided in the handrail member.

Thus, in the ninth aspect, the foldable table can be produced from the accommodation portion if necessary, in addition to the function as the handrail member, which is convenient. Besides, by making the table foldable, the space of the accommodation portion can be minimized. As a result, the handrail member can be made compact.

A tenth aspect of a handrail structure is obtained by modifying the handrail structure according to any one of first to ninth aspect as follows. That is, the handrail member is provided with a light-guiding member that can radiate light through light guiding.

In the handrail structure according to the tenth aspect, the handrail member is provided with the light-guiding member. Thus, even when the handrail member is used at night, the position of the handrail member can be confirmed through light guiding by the light-guiding member. Besides, the passenger is allowed to check where his or her feet are in getting on or off the vehicle, by irradiating the lower side of the handrail member through light guiding by the light-guiding member. Incidentally, the light-guiding member is equipped with, for example, a light-emitting portion such as an LED or the like, and guides and radiates the light emitted by the light-emitting portion.

As described above, the handrail structure according to claim 1 has an excellent effect of making it possible to protrude the free end portion of the handrail member outward in the vehicle width direction when the side door is opened.

The handrail structure according to claim 2 has an excellent effect of making it possible to automatically protrude the handrail member outward in the vehicle width direction due to the urging force of the urging member as soon as the side door is opened.

The handrail structure according to claim 3 has an excellent effect of making it possible to make the cost lower than in the case where the armrest and the handrail member are provided separately from each other.

The handrail structure according to claim 4 has an excellent effect of making it possible to safely help the passenger get on or off the vehicle with his or her hand placed on the handrail member.

The handrail structure according to claim 5 has an excellent effect of making it possible to make the handrail member usable when the side door is opened.

The handrail structure according to claim 6 has an excellent effect of making it possible to make the cost lower than in the case where the handrail member is supported in a cantilever manner.

The handrail structure according to claim 7 has an excellent effect of making it possible to make the handrail member serve also as the armrest.

The handrail structure according to claim 8 has an excellent effect of making it possible to adjust the length of the handrail member and, hence providing convenience.

The handrail structure according to claim 9 has an excellent effect of making it possible to produce the foldable table from the accommodation portion of the handrail member if necessary and, hence providing convenience.

The handrail structure according to claim 10 has an excellent effect of making it possible to confirm the position of the handrail member through light guiding by the light-guiding member even when the handrail member is used at night.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 21 is a cross-sectional view of the vehicle lateral portion taken along a line H-H shown in FIG. 18;

DETAILED DESCRIPTION OF EMBODIMENTS

A vehicle to which a handrail structure according to each of the embodiments of the present disclosure is applied will be described hereinafter with reference to the drawings. Incidentally, arrows UP, FR and OUT, which are shown in the respective drawings as appropriate, indicate an upward direction with respect to the vehicle, a forward direction with respect to the vehicle, and an outward direction along a vehicle width direction, respectively. Besides, a longitudinal direction, a vertical direction, and a lateral direction that will be used in the following description mean the longitudinal direction with respect to the vehicle, the vertical direction with respect to the vehicle, and the lateral direction in the case where the vehicle is oriented in a traveling direction thereof, respectively, unless otherwise specified.

First Embodiment

First of all, the vehicle to which the handrail structure according to the first embodiment is applied will be described. Then, the configuration of a handrail member to which the handrail structure according to the first embodiment is applied will be described.

Figure 1:
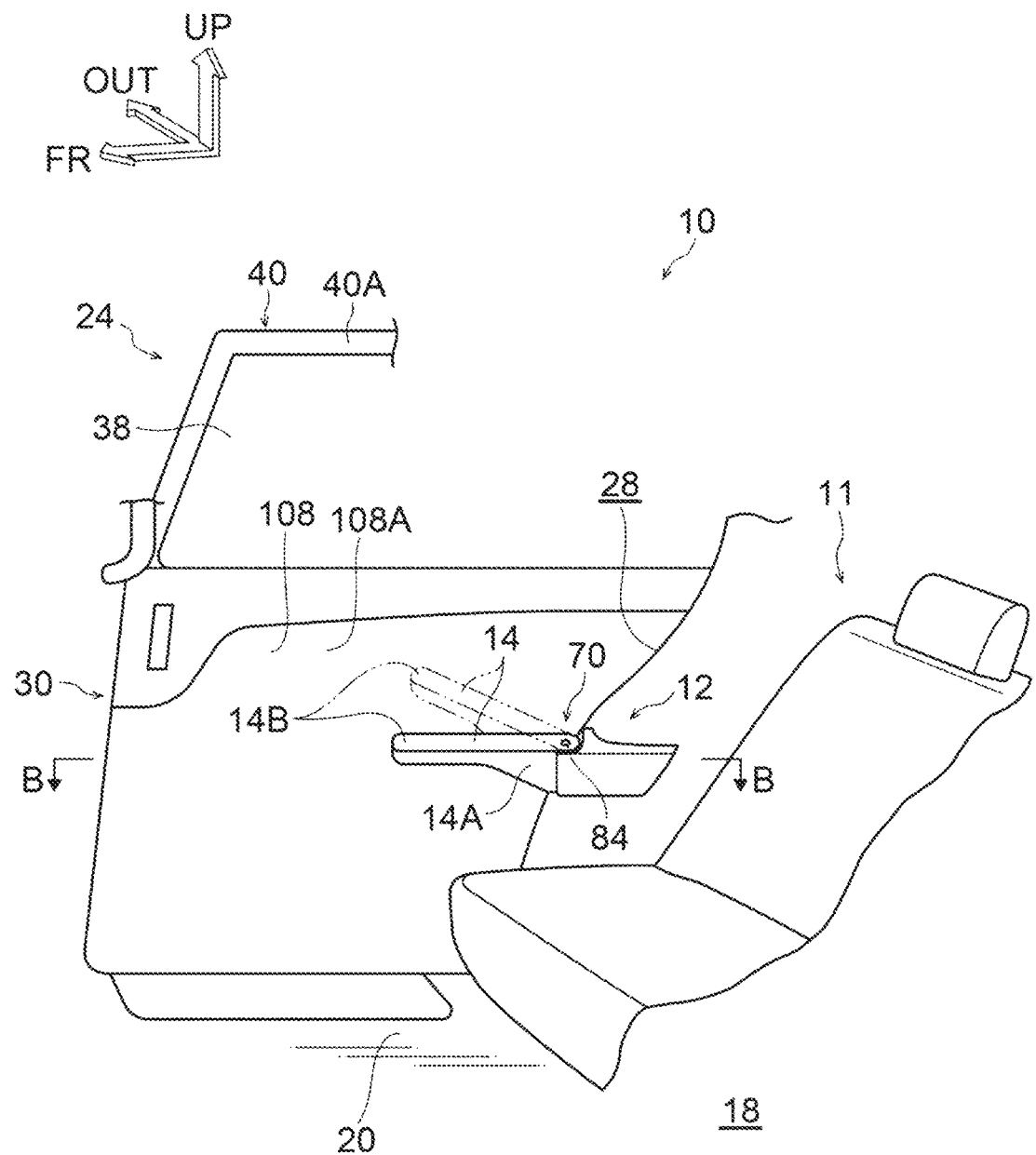
FIG. 1 is a perspective view showing a handrail member with a sliding door closed up, as viewed from a vehicle cabin interior side, in a vehicle to which a handrail structure according to the first embodiment is applied.
Figure 2:
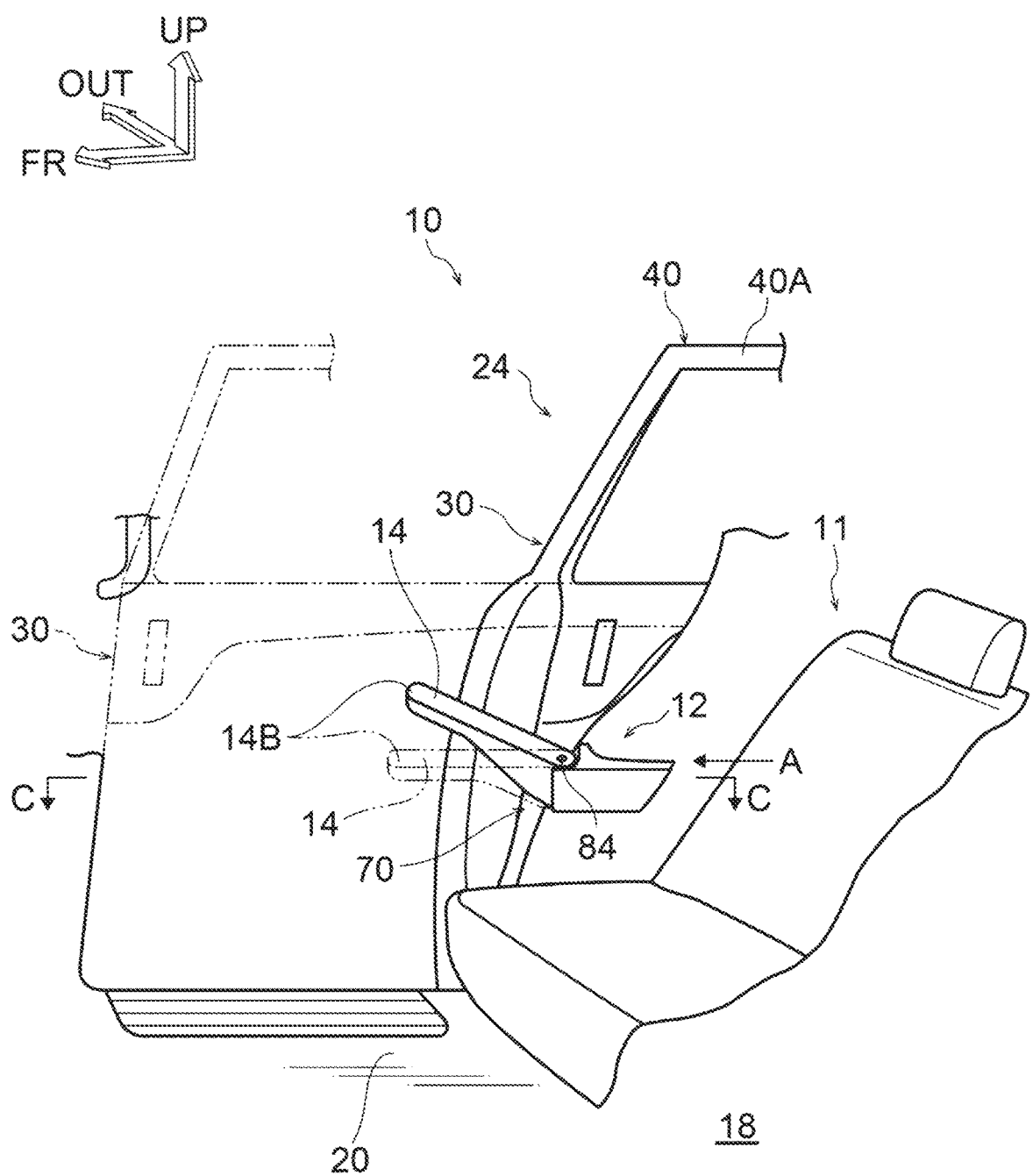
FIG. 2 is a perspective view showing the handrail member with the sliding door open, as viewed from the vehicle cabin interior side, in the vehicle to which the handrail structure according to the first embodiment is applied.

Each of FIGS. 1 and 2 is a perspective view of a handrail member 14 constituting part of a handrail structure 12 according to the present embodiment as viewed from a vehicle cabin interior 18 side, in a vehicle 10 to which the handrail structure 12 is applied. FIG. 1 shows a state where a sliding door 30 (which will be described later) provided diagonally in front of a vehicle seat 11, which is arranged on a central portion side or a rear portion side in the vehicle longitudinal direction of the vehicle 10, is closed up. FIG. 2 shows a state where the sliding door 30 is (completely) open. Besides, FIG. 3 is an arrow view as viewed from a direction indicated by an arrow A shown in FIG. 2.

Figure 3:
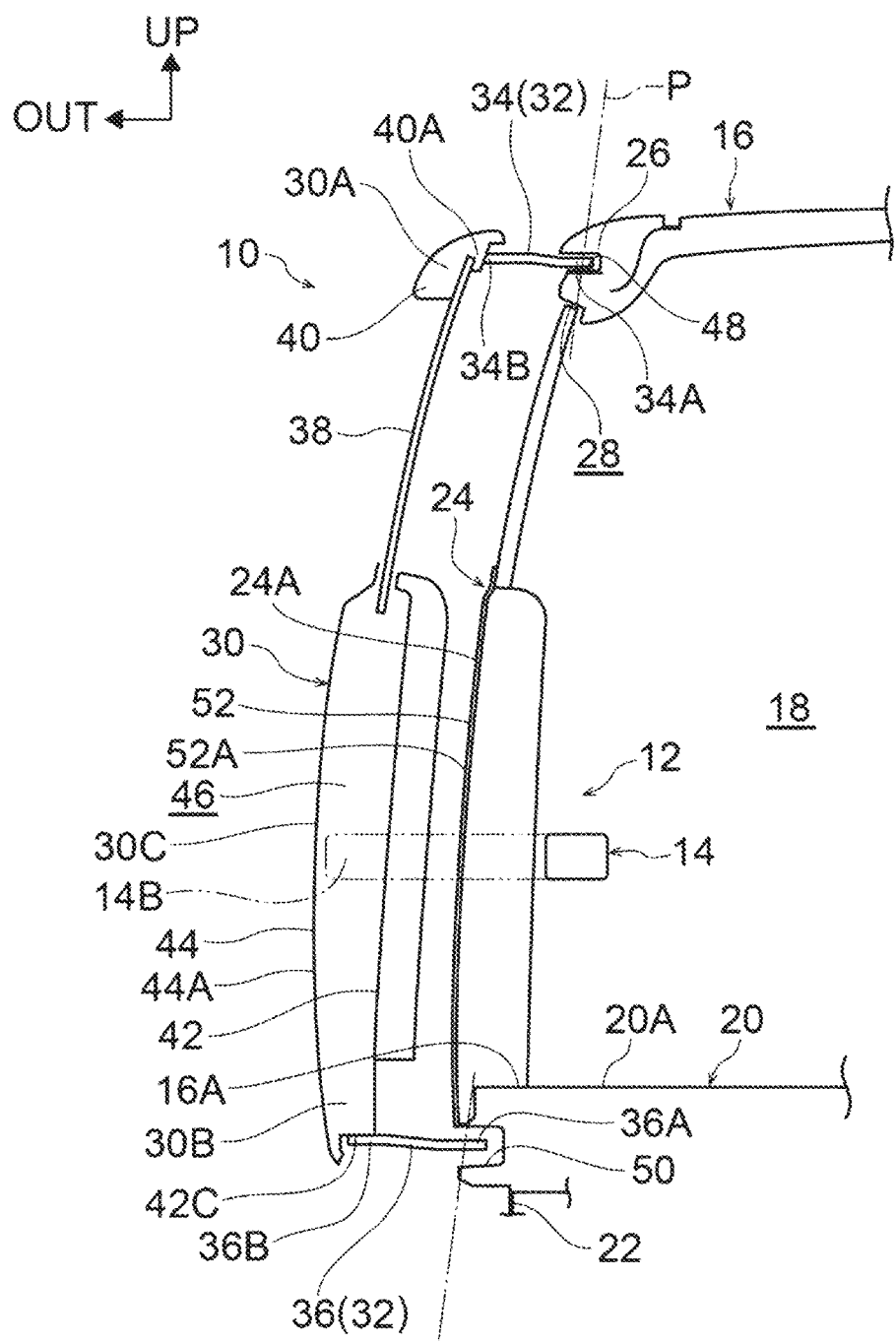
FIG. 3 is an arrow view as viewed from a direction indicated by an arrow A shown in FIG. 2.

As shown in FIG. 3, an automobile (which will be referred to hereinafter as "the vehicle" for the sake of convenience of explanation) 10 that is equipped with the handrail member 14 to which the handrail structure 12 according to the present embodiment is applied is equipped with a floor panel 20 constituting a floor surface 20A of the vehicle cabin interior 18, at a lower portion 16A of a vehicle body 16. The floor panel 20 is made of, for example, metal, and is extended in the vehicle width direction and the vehicle longitudinal direction, with a board thickness direction of the floor panel 20 coinciding with the vehicle vertical direction. Besides, rockers 22 are extended along the vehicle longitudinal direction, at both ends of the floor panel 20 in the vehicle width direction, respectively.

On the other hand, pillars (not shown) (a so-called front pillar, a center pillar 57 (see FIG. 7), and a quarter pillar 58 (see FIG. 7), which are arranged in this sequence from a front portion side of the vehicle) can be disposed along the vehicle vertical direction, at predetermined intervals along the vertical longitudinal direction at a lateral portion 24 of the vehicle body 16 (hereinafter referred to as "the vehicle lateral portion"). A lower end portion of each of the pillars in the vehicle vertical direction is linked with the corresponding one of the rockers 22.

Besides, a roof side rail 26 that constitutes an upper portion of the vehicle lateral portion 24 and that is extended along the vehicle longitudinal direction is linked with an upper end portion of each of the pillars in the vehicle vertical direction. Incidentally, the rockers 22, the respective pillars, and the roof side rail 26 are each formed of metal, constitute a closed cross-sectional portion, and are formed as a skeleton member.

As shown in FIGS. 1 and 2, in the vehicle 10, an opening portion 28 through which a passenger can get on/off the vehicle is formed in the vehicle lateral portion 24. The opening portion 28 can be opened/closed by the sliding door 30 slidably provided along the vehicle longitudinal direction.

As shown in FIG. 3, a side window 38 is provided on an upper portion side of the sliding door 30, and the periphery of the side window 38 is supported by an inverse U-shaped door frame 40 that opens downward in a lateral view of the vehicle.

On the other hand, a lower portion side of the sliding door 30 is configured to include a metal door inner panel 42 that is arranged inside the sliding door 30 in the vehicle width direction and that constitutes an inner plate of the sliding door 30, and a metal door outer panel 44 that is arranged outside the sliding door 30 in the vehicle width direction and that constitutes an outer plate of the sliding door 30. A closed cross-sectional portion 46 is formed between the door outer panel 44 and the door inner panel 42, and the side window 38 can be accommodated in the closed cross-sectional portion 46. Incidentally, the door inner panel 42 and the door outer panel 44 may be formed of resin.

Figure 7:
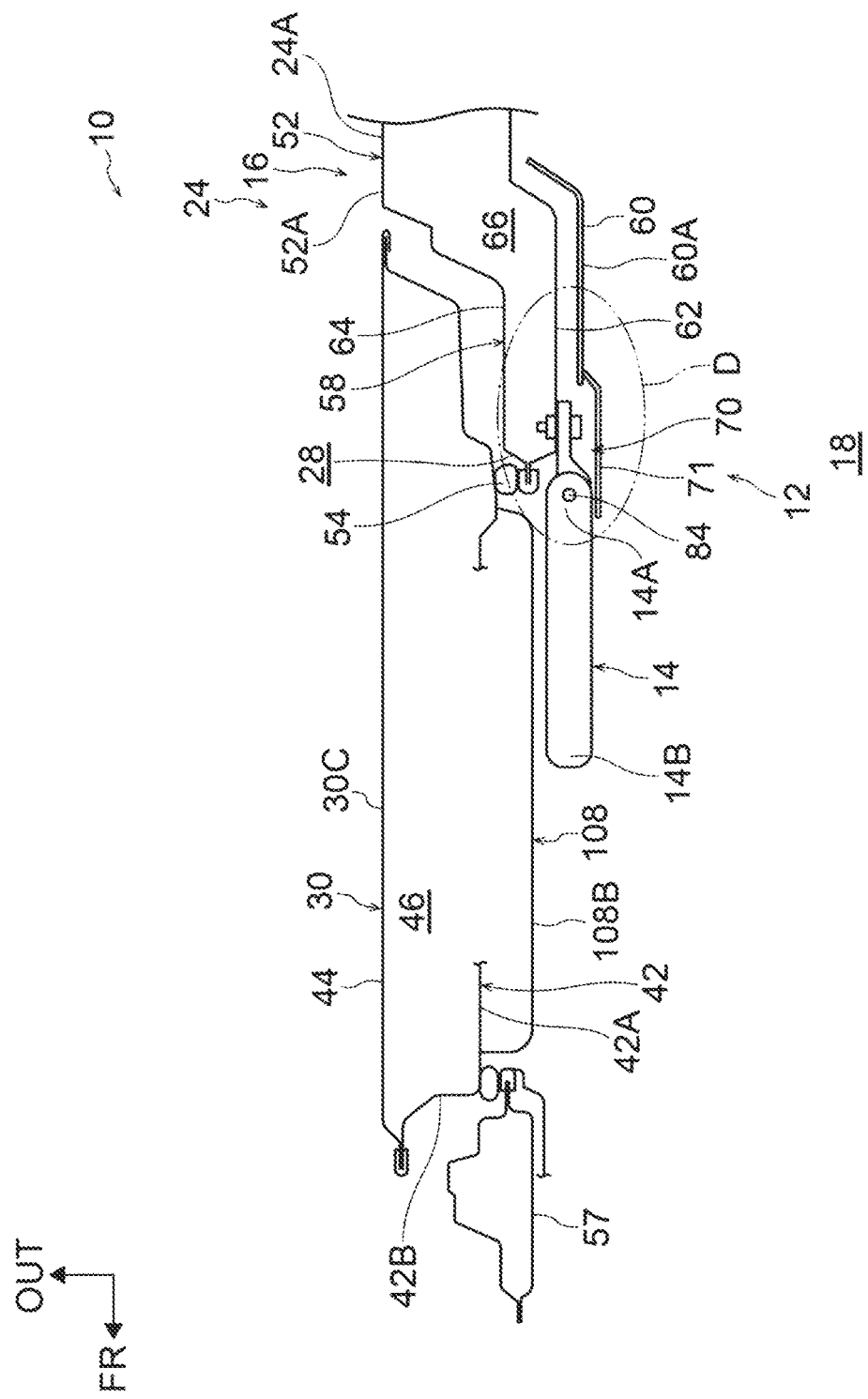
FIG. 7 is a cross-sectional view of a vehicle lateral portion taken along a line B-B shown in FIG. 1.
Figure 8:
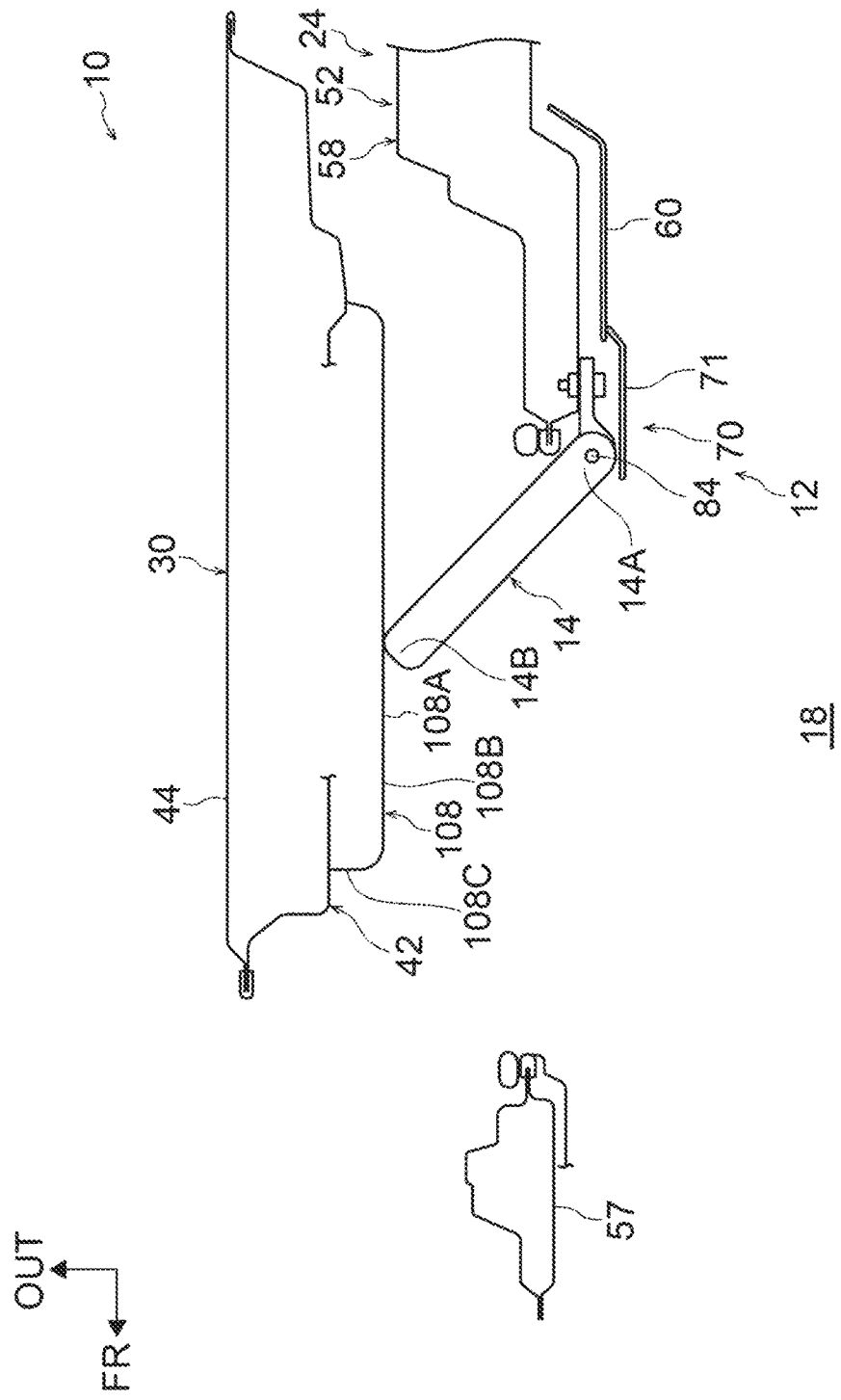
FIG. 8 is a cross-sectional view of the vehicle lateral portion corresponding to FIG. 7, showing a state where the sliding door is about to be opened or a state where the sliding door is about to be closed up, in the vehicle to which the handrail structure according to the first embodiment is applied.
Figure 9:
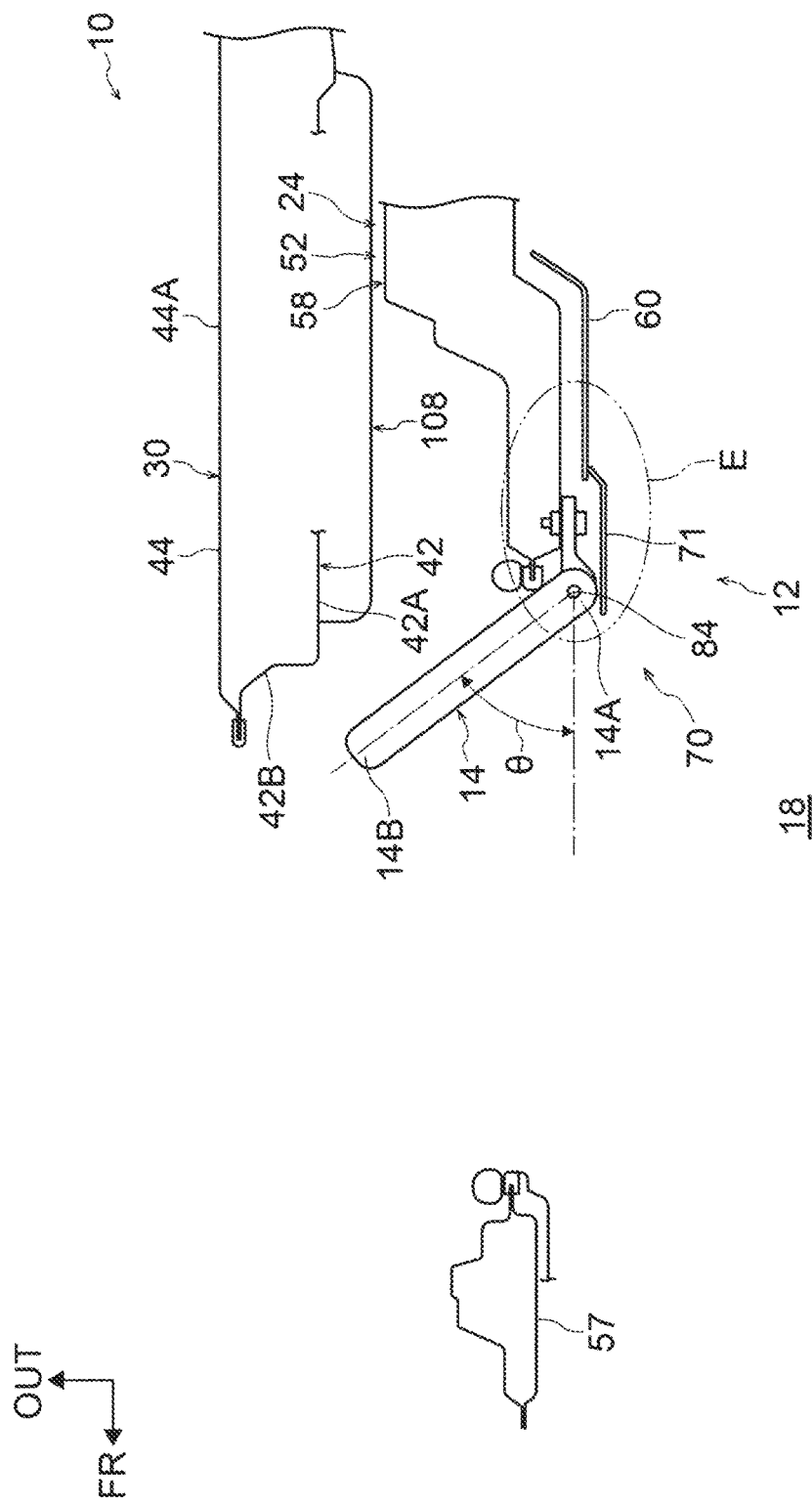
FIG. 9 is a cross-sectional view of the vehicle lateral portion taken along a line C-C shown in FIG. 2.

It should be noted herein that FIG. 7 is a cross-sectional view of the vehicle lateral portion 24 taken along a line B-B shown in FIG. 1, and that FIG. 9 is a cross-sectional view of the vehicle lateral portion 24 taken along a line C-C shown in FIG. 2. Incidentally, FIG. 8 is a cross-sectional view of the vehicle lateral portion 24 corresponding to FIG. 7, showing a state where the sliding door 30 is about to be opened or about to be closed up. Respective members shown in FIGS. 7 to 9 are depicted in a simple diagrammatic manner.

As shown in FIGS. 3 and 7, the door inner panel 42 is configured to include a main body portion 42A that is arranged along the vehicle longitudinal direction and the vehicle vertical direction, and a lateral wall portion 42B that is bent outward in the vehicle width direction from an outer edge of the main body portion 42A. Moreover, a door trim 108 that constitutes a design surface 108A is provided on the vehicle cabin interior 18 side of the main body portion 42A.

Besides, as shown in FIG. 3, the sliding door 30 is provided with a hinge member 32 that slidably couples the sliding door 30 to the vehicle lateral portion 24 along the vehicle longitudinal direction. This hinge member 32 is configured to include an upper hinge member 34 that is coupled to an upper end portion 30A of the sliding door 30, and a lower hinge member 36 that is coupled to a lower end portion 30B of the sliding door 30.

For example, the upper hinge member 34 assumes a substantially rectangular shape in a plan view, although not shown in the drawing. One end portion 34A of the upper hinge member 34 in a length direction thereof is coupled to a sliding door upper rail 48 that is provided on the roof side rail 26 side. Besides, the other end portion 34B of the upper hinge member 34 in the length direction thereof is coupled to an upper side portion 40A of the door frame 40 that is provided at the upper end portion 30A of the sliding door 30.

Besides, as is the case with the upper hinge member 34, the lower hinge member 36 assumes a substantially rectangular shape in a plan view, although not shown in the drawing. One end portion 36A of the lower hinge member 36 in a length direction thereof is coupled to a sliding door lower rail 50 that is provided on the rocker 22 side. Besides, the other end portion 36B of the lower hinge member 36 in the length direction thereof is coupled to a lower end portion 42C of the door inner panel 42 that constitutes part of the sliding door 30.

Owing to the foregoing configuration, the sliding door 30 can slide along the sliding door upper rail 48 and the sliding door lower rail 50 along the vehicle longitudinal direction, via the upper hinge member 34 and the lower hinge member 36 of the sliding door 30.

Besides, the upper hinge member 34 and the lower hinge member 36 are provided with rollers (not shown) rotatably along the vehicle width direction, respectively, with a virtual line P along the vehicle vertical direction serving as an axial centerline. The sliding door 30 can rotate (turn) around the axes of these rollers, along the vehicle width direction (the substantially horizontal direction). Thus, the sliding door 30 is arranged outside a quarter panel 52, which constitutes, in an open state thereof, a design surface of a rear portion 24A of the vehicle lateral portion 24, in the vehicle width direction.

On the other hand, as shown in FIG. 7, a design surface 30C of the sliding door 30 and a design surface 52A of the quarter panel 52 are substantially flush with each other, with the sliding door 30 closed up. That is, the design surface 30C of the sliding door 30 and the design surface 52A of the quarter panel 52 are formed substantially continuously along the vehicle longitudinal direction. Incidentally, an opening trim 54 is attached to an inner edge of the opening portion 28 of the vehicle lateral portion 24, and seals a gap between the sliding door 30 and the vehicle body 16, with the sliding door 30 closed up.

Configuration of Handrail Structure

The configuration of the handrail member to which the handrail structure according to the first embodiment is applied will now be described.

Figure 4:
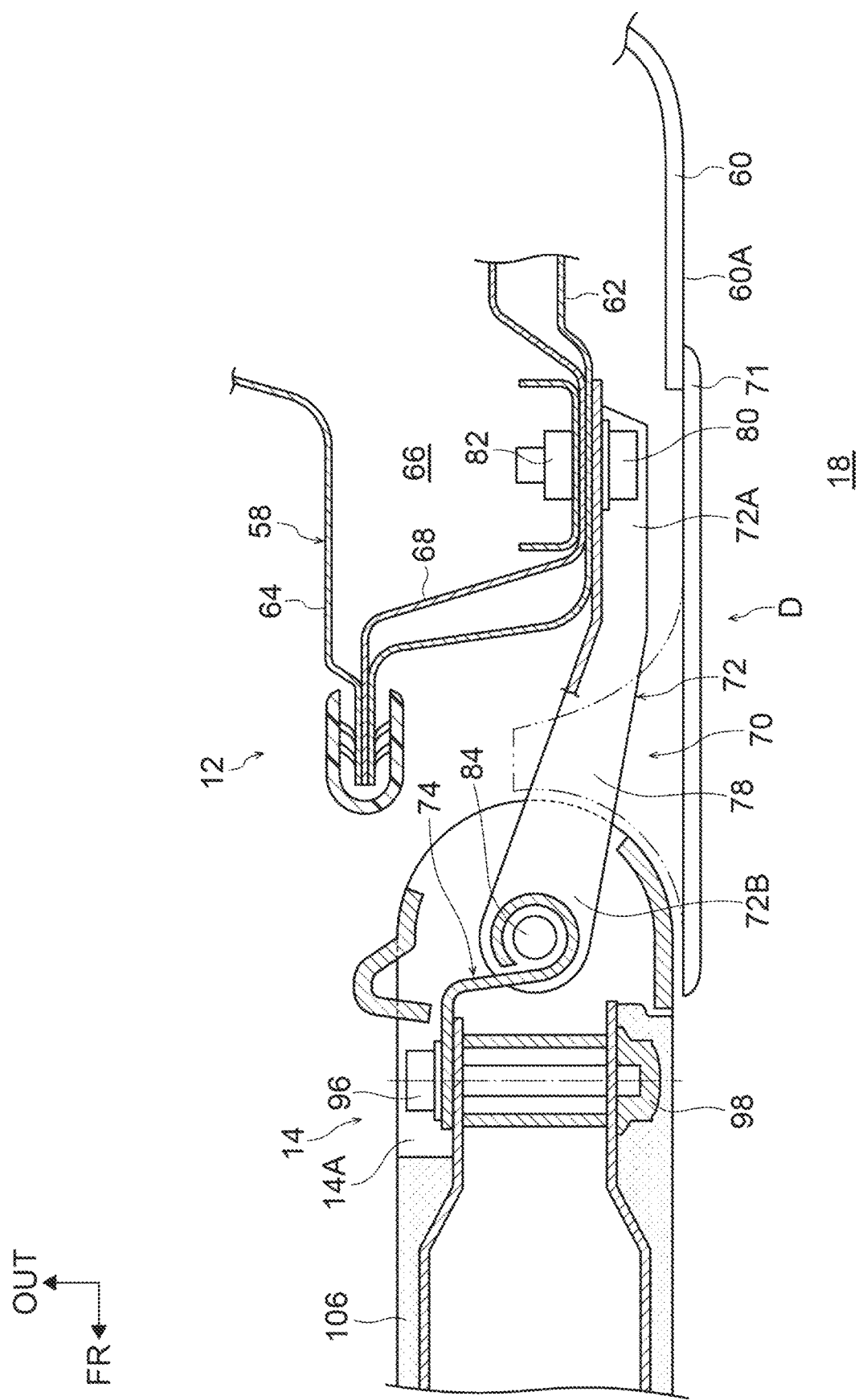
FIG. 4 is a partially enlarged cross-sectional view of a D region shown in FIG. 7 on an enlarged scale.
Figure 5:
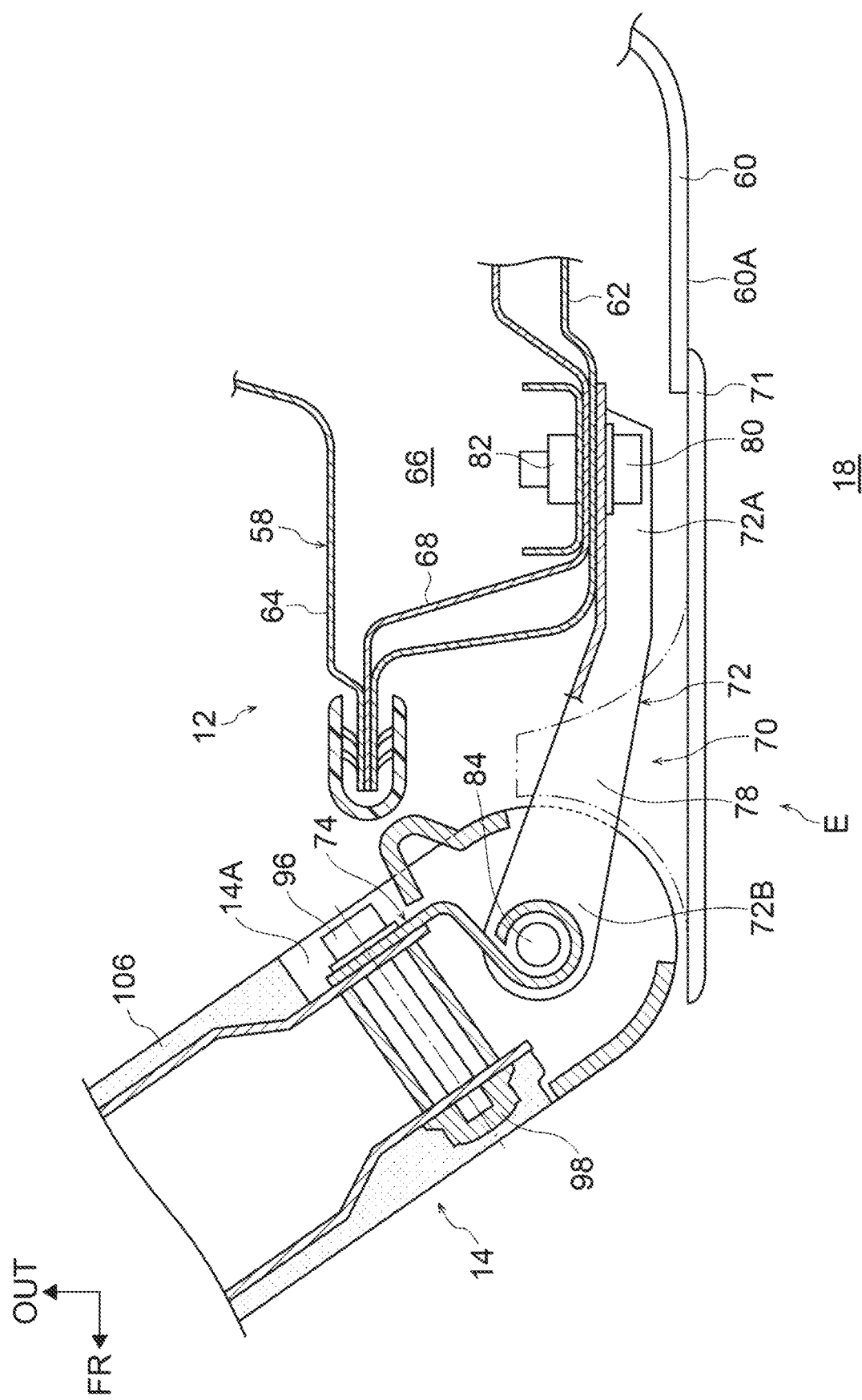
FIG. 5 is a partially enlarged cross-sectional view of an E region shown in FIG. 9 on an enlarged scale.

FIG. 4 is a partially enlarged cross-sectional view of a D region of the handrail member 14 shown in FIG. 7 on an enlarged scale. FIG. 5 is a partially enlarged cross-sectional view of an E region of the handrail member 14 shown in FIG. 9 on an enlarged scale. As shown in FIGS. 4 and 7, the quarter pillar (the vehicle lateral portion) 58 is provided inside the quarter panel 52 in the vehicle width direction. Incidentally, a quarter pillar garnish 60 is provided inside the quarter pillar 58 in the vehicle width direction. A surface 60A of the quarter pillar garnish 60 serves as a design surface on the vehicle cabin interior 18 side.

In the present embodiment, the quarter pillar 58 is provided with the handrail member 14 along the vehicle longitudinal direction. The quarter pillar 58 is configured to include a quarter pillar inner member (hereinafter referred to as "the pillar inner member") 62 that is provided inside the quarter pillar 58 in the vehicle width direction, and a quarter pillar outer member (hereinafter referred to as "the pillar outer member") 64 that is provided outside the quarter pillar 58 in the vehicle width direction.

A closed cross-sectional portion 66 is formed between this pillar outer member 64 and this pillar inner member 62. In this closed cross-sectional portion 66, a quarter pillar reinforcement (hereinafter referred to as "the pillar R/F") 68 is provided on the pillar inner member 62 side. The pillar R/F 68 is linked with the pillar outer member 64 and the pillar inner member 62 through welding or the like.

Moreover, in the present embodiment, the handrail member 14 is attached to the pillar inner member 62 and the pillar R/F 68 via a turning support portion 70, with the pillar inner member 62 and the pillar R/F 68 overlapping with each other. Incidentally, the turning support portion 70 is provided with a cover 71 that covers the turning support portion 70, and is attached to the quarter pillar garnish 60 in such a manner as not to be exposed to the vehicle cabin interior 18 side.

Figure 6:
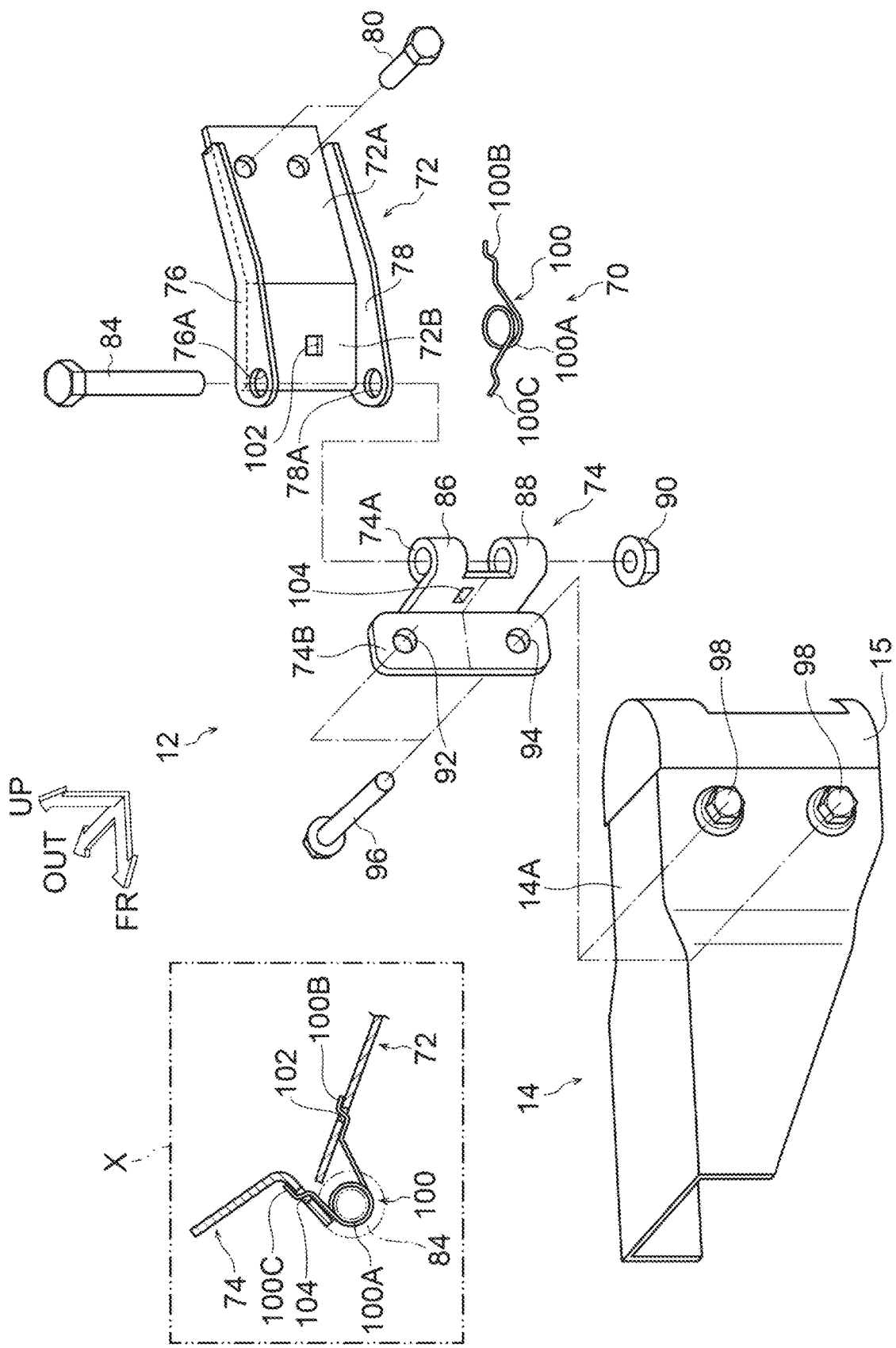
FIG. 6 is an exploded perspective view showing the configuration of the handrail structure according to the first embodiment.

It should be noted herein that FIG. 6 is an exploded perspective view of the turning support portion 70. As shown in FIG. 6, the turning support portion 70 is configured to include, for example, a hinge member 72 and a hinge member 74. The hinge member 72 assumes a substantially rectangular shape in the lateral view of the vehicle. An upper flange 76 and a lower flange 78 bulge out from an upper end and a lower end of this hinge member 72 respectively, inward in the vehicle width direction, and the upper flange 76 and the lower flange 78 are formed opposite each other. The hinge member 74 is provided between the upper flange 76 and the lower flange 78.

As shown in FIGS. 4 and 6, one end portion 72A of the hinge member 72 in a length direction thereof is fixed to the pillar inner member 62 and the pillar R/F 68 via bolts 80 and nuts 82. Besides, at the other end portion 72B of the hinge member 72 in the length direction thereof, insertion holes 76A and 78A are formed through the upper flange 76 and the lower flange 78 respectively along the vehicle vertical direction, and a bolt (a turning support portion) 84 can be inserted through the insertion holes 76A and 78A.

On the other hand, the hinge member 74 assumes a substantially crank-like shape in a plan view, and one side 74A of the hinge member 74 is arranged between the upper flange 76 and the lower flange 78. On one side 74A of the hinge member 74, cylindrical portions 86 and 88 are provided in upper and lower regions of the hinge member 74, opposite the insertion hole 76A of the upper flange 76 and the insertion hole 78A of the lower flange 78, respectively.

The bolt 84 can be inserted through these cylindrical portions 86 and 88, and the bolt 84 is inserted through the insertion hole 76A of the upper flange 76 of the hinge member 72, the cylindrical portions 86 and 88 of the hinge member 74, and the insertion hole 78A of the lower flange 78. The bolt 84 is fixed by a nut 90. The hinge member 74 can turn along the vehicle width direction (the substantially horizontal direction), around the bolt 84 with respect to the hinge member 72, via the cylindrical portions 86 and 88.

Besides, on the other side 74B of the hinge member 74, insertion holes 92 and 94 are formed through the upper and lower regions of the hinge member 74 respectively, and bolts 96 can be inserted through the insertion holes 92 and 94 respectively. The bolts 96 are screwed into weld nuts 98 provided at a root portion 14A of the handrail member 14 respectively, and the handrail member 14 is fixed to the hinge member 74 by the bolts 96 and the weld nuts 98.

Incidentally, the hinge member 74 is covered by a handrail cover 15 attached to the root portion 14A of the handrail member 14, so as not to be exposed to the outside.

Furthermore, the hinge member 74 is fitted with, for example, a torsion spring (an urging member) 100. The bolt 84 is inserted through a central portion 100A of this torsion spring 100, one end portion 100B of the torsion spring 100 is engaged with an engagement hole 102 formed through the hinge member 72, and the other end portion 100C of the torsion spring 100 is engaged with an engagement hole 104 formed through the hinge member 74. Incidentally, FIG. 6 shows, in an X region thereof, a cross-section with the torsion spring 100 engaged with the hinge members 72 and 74.

When the torsion spring 100 is in a natural state thereof, the handrail member 14 is arranged in such a direction as to protrude outward in the vehicle width direction (the handrail member 14 is at a usable position thereof), as shown in FIGS. 5 and 9.

Therefore, in the present embodiment, the handrail member 14 needs to be moved in such a direction as to resist the urging force of the torsion spring 100 (see FIG. 6), in order to arrange the handrail member 14 along the vehicle longitudinal direction (the handrail member 14 is at a reference position thereof), as shown in FIGS. 4 and 7. Moreover, elastic energy is accumulated in the torsion spring 100 (see FIG. 6), through arrangement of the handrail member 14 along the vehicle longitudinal direction.

Incidentally, in the present embodiment, when the handrail member 14 is at the usable position thereof, a tip portion (a free end portion) 14B of the handrail member 14 is arranged on a moving locus of the sliding door 30. Besides, in the present embodiment, the handrail member 14 is locked at the reference position thereof by a lock device (not shown), while being arranged along the vehicle longitudinal direction. This lock device moves in such a manner as to interlock with the operation of opening/closing the sliding door 30, and is set in such a manner as to operate with the sliding door 30 closed up or completely released.

It should be noted herein that the handrail member 14 is formed of, for example, a steel plate. The handrail member 14 has an inverse U-shaped cross-section that opens on a lower side thereof, when taken along a width direction of the handrail member 14 that is substantially perpendicular to the length direction thereof. Besides, a foamed layer 106 (see FIG. 4) is provided on a surface of the handrail member 14, and the foamed layer 106 is formed by a foamed material.

By the way, as shown in FIG. 8, the tip portion 14B of the handrail member 14 abuts on a door trim 108 provided on the door inner panel 42 of the sliding door 30. The door trim 108 is configured to include a main body portion 108B that is arranged along the vehicle longitudinal direction and the vehicle vertical direction, and a lateral wall portion 108C that is bent outward in the vehicle width direction from an outer edge of the main body portion 108B.

Incidentally, in FIG. 7, the handrail member 14 does not abut on the main body portion 108B of the door trim 108, with the sliding door 30 closed up. However, the handrail member 14 may be set in such a manner as to abut on the main body portion 108B of the door trim 108. In this case, the handrail member 14 is set in such a manner as to be arranged along the vehicle longitudinal direction, while abutting on the door trim 108.

In this manner, in the case where the handrail member 14 is set in such a manner as to abut on the door trim 108 with the sliding door 30 closed up, the handrail member 14 is kept from moving outward in the vehicle width direction, by abutting on the door trim 108. Therefore, the lock device that locks the handrail member 14 at the reference position thereof is unnecessary.

Besides, when being opened, the sliding door 30 slides backward with respect to the vehicle, while being arranged outside the quarter panel 52 in the vehicle width direction, as shown in FIGS. 2 and 3.

Thus, in the present embodiment, the tip portion 14B of the handrail member 14 shifts from a position where the tip portion 14B abuts on the main body portion 108B of the door trim 108 to a position where the tip portion 14B abuts on the door inner panel 42, as shown in FIGS. 7 to 9. The door inner panel 42 is located outside the main body portion 108B of the door trim 108 in the vehicle width direction. Therefore, the handrail member 14 further turns outward in the vehicle width direction from the position where the handrail member 14 abuts on the main body portion 108B of the door trim 108.

In the present embodiment, when the tip portion 14B of the handrail member 14 turns outward in the vehicle width direction and the handrail member 14 reaches a predetermined turning angle (θ; about 60°) (the handrail member 14 is at the usable position thereof), the turning angle of the handrail member 14 is held by the lock device (not shown).

Incidentally, a plurality of usable positions of the handrail member 14 may be set. That is, the handrail member 14 may be set in such a manner as to be held at a turning angle other than 60° as well. Besides, the urging member should not necessarily be the torsion spring 100. A compression spring or the like may be used as the urging member. Furthermore, the urging member such as the torsion spring 100 or the like is not absolutely necessary. The handrail member 14 may be manually arranged at a predetermined position.

Operation and Effect of Handrail Structure

Next, the operation and effect of the handrail member 14 to which the handrail structure 12 according to the present embodiment is applied will be described.

In the present embodiment, as shown in, for example, FIG. 7, the handrail member 14 is arranged along the vehicle longitudinal direction (the handrail member 14 is at the reference position thereof), with the sliding door 30 closed up. Incidentally, in this state, elastic energy is accumulated in the torsion spring 100 (see FIG. 6) provided on the handrail member 14.

Therefore, as shown in FIG. 9, when the sliding door 30 is (completely) opened and stopped from being locked by the lock device (not shown), the tip portion 14B of the handrail member 14 turns outward in the vehicle width direction around the bolt 84, due to the urging force of the torsion spring 100 (see FIG. 6). Thus, the handrail member 14 is arranged from the reference position thereof to the usable position thereof. Then, when the handrail member 14 reaches a predetermined angle, the turning angle of the handrail member 14 is fixed by the lock device (not shown).

In this manner, according to the present embodiment, the handrail member 14 is in the deployed state thereof and at the so-called usable position thereof, while being fixed with the sliding door 30 open, and with the tip portion 14B of the handrail member 14 having turned more outward in the vehicle width direction than the vehicle cabin interior 18. In this manner, by making the handrail member 14 usable, the passenger can place his or her hand on the handrail member 14 in getting on or off the vehicle. As a result, it is possible to help the passenger get on/off the vehicle.

On the other hand, as shown in FIG. 8, when the sliding door 30 is closed up, the tip portion 14B of the handrail member 14 is arranged on the vehicle cabin interior 18 side by being pushed by the sliding door 30. Moreover, as shown in FIG. 7, the handrail member 14 is arranged along the vehicle longitudinal direction, with the sliding door 30 closed up. In this manner, when being arranged along the vehicle longitudinal direction on the vehicle cabin interior 18 side, the handrail member 14 is in a stored state thereof and at the so-called reference position thereof.

As described above, in the present embodiment, the handrail member 14 can be deployed and stored with a simple configuration, by turning the handrail member 14 along the vehicle width direction around the bolt 84, as shown in FIGS. 7 to 9.

Besides, in the present embodiment, the tip portion 14B of the handrail member 14 can be turned along the vehicle width direction (the horizontal direction), around the bolt 84 fastened along the vehicle vertical direction. Moreover, when the sliding door 30 is closed up, the handrail member 14 is automatically arranged on the vehicle cabin interior 18 side by being pushed by the sliding door 30.

In this manner, according to the present embodiment, even in the case where the sliding door 30 and the tip portion 14B of the handrail member 14 overlap with each other in the lateral view of the vehicle with the sliding door 30 open, the tip portion 14B of the handrail member 14 can be protruded outward in the vehicle width direction, by turning the handrail member 14 around the bolt 84 along the vehicle width direction. That is, when the sliding door 30 is opened, the handrail member 14 becomes usable.

Besides, in the present embodiment, the tip portion 14B of the handrail member 14 is protruded more outward in the vehicle width direction than the vehicle cabin interior 18, with the sliding door 30 open. Thus, when the passenger gets on or off the vehicle, the handrail member 14 can be kept from being arranged on the moving locus of the passenger. Thus, the passenger can smoothly get on or off the vehicle.

Incidentally, in the present embodiment, when the sliding door 30 is closed up, the handrail member 14 is arranged on the vehicle cabin interior 18 side by being pushed by the sliding door 30, with the sliding door 30 abutting on the tip portion 14B of the handrail member 14.

However, nothing else is required as long as the handrail member 14 can be arranged on the vehicle cabin interior 18 side by being pushed by the sliding door 30, when the sliding door 30 is closed up, so an applicable embodiment of the present disclosure should not be limited thereto. That is, the sliding door 30 is not absolutely required to abut on the tip portion 14B of the handrail member 14, but may abut on other portions of the handrail member 14.

It should be noted herein that the tip portion 14B of the handrail member 14 may be set in such a manner as to be arranged between the sliding door 30 and the vehicle lateral portion 24, with the sliding door 30 open, and with the tip portion 14B of the handrail member 14 protruded more outward in the vehicle width direction than the vehicle cabin interior 18, as shown in FIG. 9.

More specifically, the tip portion 14B of the handrail member 14 may be set in such a manner as to be arranged between a design surface 44A of the door outer panel 44 of the sliding door 30 and the design surface 52A of the quarter panel 52, with the tip portion 14B of the handrail member 14 protruded more outward in the vehicle width direction than the vehicle cabin interior 18.

In this case, the handrail member 14 can be used inside the door outer panel 44 of the sliding door 30 in the vehicle width direction, with the sliding door 30 open. In other words, according to the present embodiment, the handrail member 14 does not protrude more outward in the vehicle width direction than the door outer panel 44 of the sliding door 30.

Accordingly, the handrail member 14 can move within a narrow space. Incidentally, as a matter of course, the tip portion 14B of the handrail member 14 may protrude outward from the door outer panel 44 of the sliding door 30 in the vehicle width direction.

On the other hand, in the present embodiment, the turning support portion 70 is provided with the torsion spring 100 that urges the handrail member 14 outward in the vehicle width direction, as shown in FIGS. 6 to 9.

In the present embodiment, when the sliding door 30 is closed up, the handrail member 14 is pressed by the sliding door 30. At this time, the torsion spring 100 is pressed in such a direction as to resist the urging force of the torsion spring 100, via the handrail member 14, and elastic energy is accumulated in the torsion spring 100.

Therefore, when the sliding door 30 is opened and arranged outside the quarter panel 52 in the vehicle width direction, the tip portion 14B of the handrail member 14 turns outward in the vehicle width direction around the bolt 84, due to the urging force of the torsion spring 100. Thus, in the present embodiment, the handrail member 14 can be automatically protruded outward in the vehicle width direction as soon as the sliding door 30 is opened.

Besides, in the present embodiment, the handrail member 14 can also serve as the armrest that supports the elbow of the sitting passenger who sits in the vehicle seat 11, with the sliding door 30 closed up, as shown in FIG. 7.

Thus, there is no need to provide the armrest and the handrail member separately from each other. In the present embodiment, therefore, the cost can be made lower than in the case where the armrest and the handrail member are provided separately from each other.

In general, in a rear seat of an automobile, the vehicle lateral portion 24 is often not provided with an armrest. Therefore, an armrest can be provided on the rear seat side with the sliding door 30 closed up, by making the handrail member 14 serve also as the armrest.

Furthermore, in the present embodiment, the handrail member 14 turns along the horizontal direction around the turning support portion 70, as shown in FIGS. 1 and 2. Therefore, even in the case where the sliding door 30 and the tip portion 14B of the handrail member 14 overlap with each other in the lateral view of the vehicle with the sliding door 30 open, the tip portion 14B of the handrail member 14 can be protruded outward in the vehicle width direction.

Incidentally, in the present embodiment, when the handrail member 14 is at the usable position thereof, the turning angle (e.g., 60°) of the handrail member 14 is held by the lock device (not shown). However, it is also appropriate to set a plurality of usable positions of the handrail member 14. That is, the handrail member 14 may be set in such a manner as to be holdable at a turning angle other than 60°.

Besides, in the present embodiment, the torsion spring 100 is used as the urging member. However, the urging member may not necessarily be the torsion spring 100. A compression spring or the like may be used as the urging member. Furthermore, the urging member is not absolutely indispensable. The handrail member 14 may be manually arranged at a predetermined position.

MODIFICATION EXAMPLES OF PRESENT EMBODIMENT

First Modification Example

In the foregoing embodiment, the handrail member 14 is supported in a cantilever manner as shown in FIG. 1, but an applicable embodiment of the present disclosure should not be limited thereto.

Figure 10:
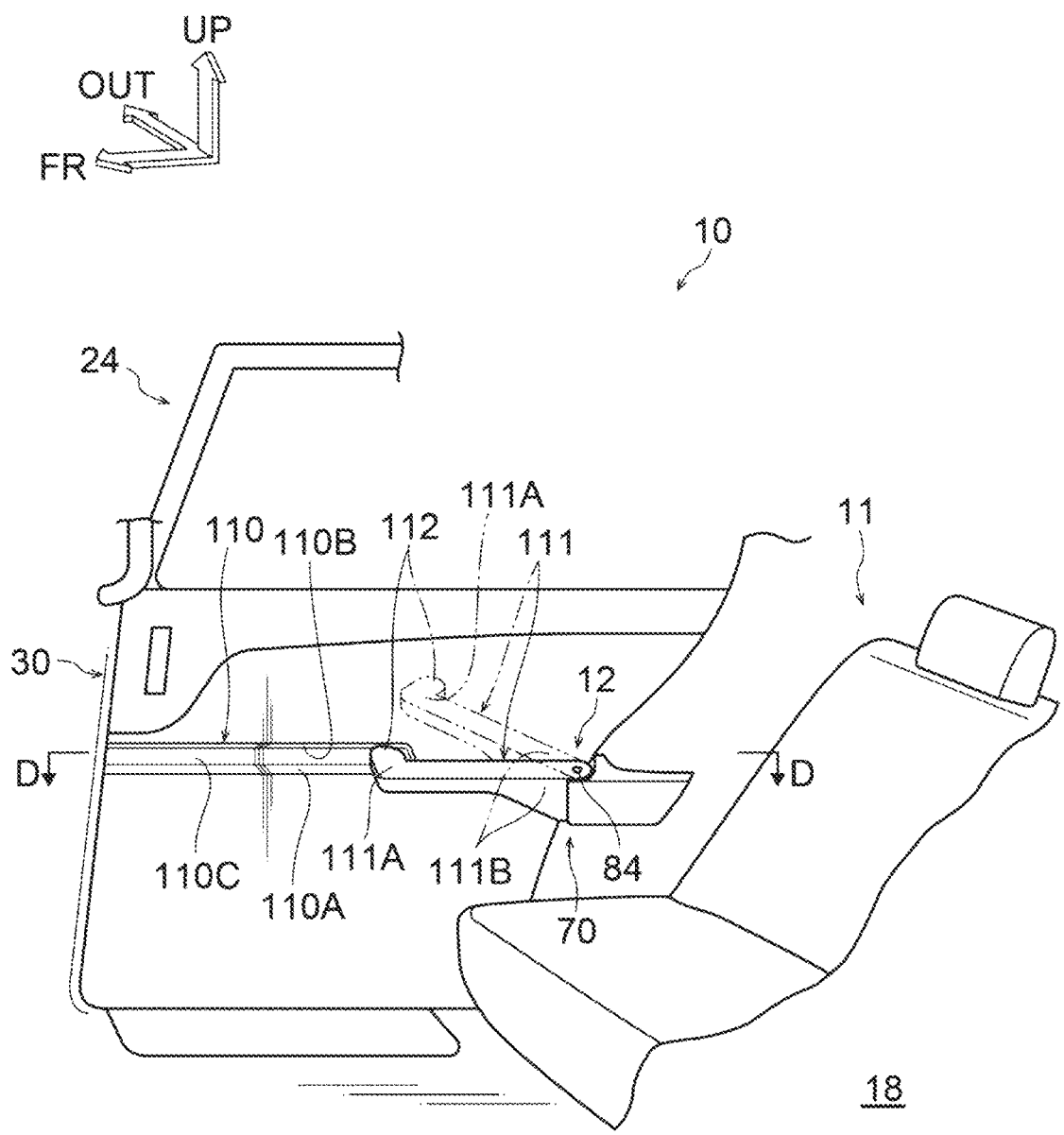
FIG. 10 is a perspective view of a handrail member corresponding to FIG. 1, showing a first modification example of the handrail structure according to the first embodiment.

As the first modification example, for example, FIG. 10 is a perspective view corresponding to FIG. 1, showing the handrail structure 12 according to the first embodiment. As shown in this drawing, a recess portion 110 that is recessed outward in the vehicle width direction may be formed in the main body portion 108B of the door trim 108. Besides, in the present embodiment, a protrusion portion 112 that protrudes outward in the vehicle width direction is provided at a tip portion 111A of a handrail member 111.

Moreover, the dimension of the recess portion 110 of the door trim 108 in a width direction thereof that is substantially perpendicular to a length direction of the recess portion 110 is set slightly larger than the dimension of the protrusion portion 112 in a thickness direction thereof.

Thus, the protrusion portion 112 formed at the tip portion 111A of the handrail member 111 can be accommodated in the recess portion 110. While being accommodated in the recess portion 110, the protrusion portion 112 is supported by a lower wall portion 110A constituting a lower portion of the recess portion 110.

That is, in the present embodiment, the tip portion 111A of the handrail member 111 is supported by the recess portion 110, via the protrusion portion 112. Therefore, the protrusion portion 112 is set such that required rigidity is ensured to support the handrail member 111.

Besides, while being accommodated in the recess portion 110, the protrusion portion 112 is kept from moving upward, by an upper wall portion 110B constituting an upper portion of the recess portion 110. Accordingly, with the protrusion portion 112 accommodated in the recess portion 110, the tip portion 111A of the handrail member 111 is kept from moving in the vertical direction.

In this manner, the handrail member 111 is supported in a stable state by being kept from moving in the vehicle vertical direction. In the present embodiment, the handrail member 111 can also serve as the armrest. Incidentally, the protrusion portion 112 may be slightly movable in the vehicle vertical direction, instead of being completely kept from moving in the vehicle vertical direction.

Besides, in the present embodiment, the handrail member 111 is arranged at the reference position thereof, and elastic energy is accumulated in the torsion spring 100 (see FIG. 6) provided on the handrail member 111, with the sliding door 30 closed up, as indicated by solid lines in FIG. 10.

Incidentally, in this state, the handrail member 111 is set in such a manner as to be locked at the reference position thereof by a lock device (not shown). It should be noted, however, that the protrusion portion 112 may be set in such a manner as to abut on an inner wall 110C of the recess portion 110, and that the handrail member 111 may be kept from turning, through abutment of the protrusion portion 112 on the inner wall 110C of the recess portion 110, with the sliding door 30 closed up.

Figure 11:
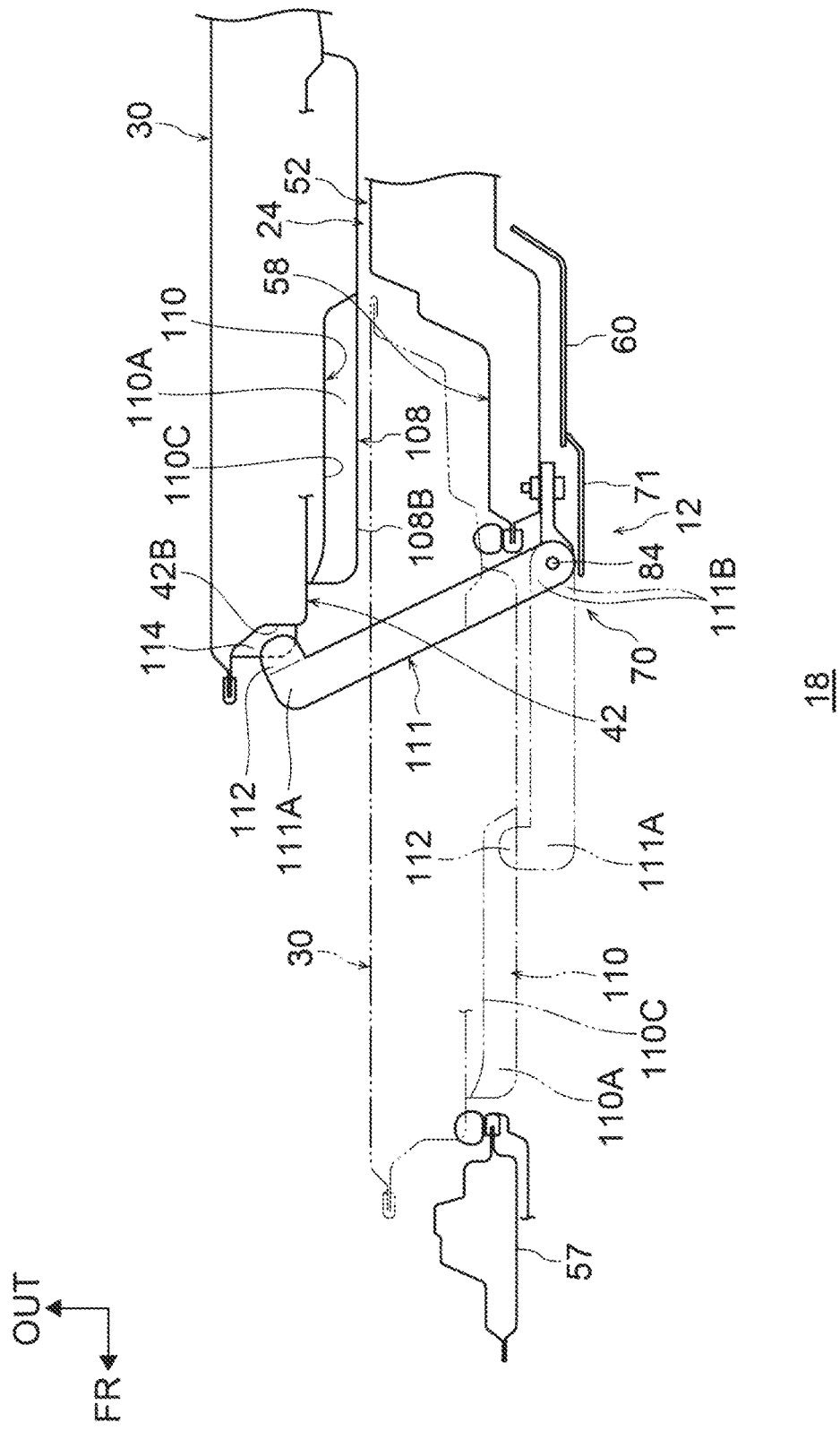
FIG. 11 is a cross-sectional view of a vehicle lateral portion taken along a line D-D shown in FIG. 10.

Besides, FIG. 11 is a cross-sectional view of the vehicle lateral portion 24 taken along a line D-D shown in FIG. 10. As indicated by solid lines in FIGS. 3 and 11, when the sliding door 30 is arranged outside the quarter panel 52 in the vehicle width direction, the tip portion 111A of the handrail member 111 moves from the recess portion 110 formed in the door trim 108 to the lateral wall portion 42B side of the door inner panel 42, as the sliding door 30 moves in a sliding manner backward with respect to the vehicle. At this time, the tip portion 111A of the handrail member 111 turns outward in the vehicle width direction around the bolt 84, due to the urging force of the torsion spring 100.

Besides, as indicated by solid lines in FIG. 11, the protrusion portion 112 provided at the tip portion 111A of the handrail member 111 moves toward the lateral wall portion 42B side of the door inner panel 42, with the sliding door 30 open.

Therefore, a support portion 114 that supports the protrusion portion 112 may be set in such a manner as to be provided on the lateral wall portion 42B side of the door inner panel 42. The protrusion portion 112 of the handrail member 111 that has been turned outward in the vehicle width direction is laid on this support portion 114.

Thus, the tip portion 111A of the handrail member 111 is supported by the support portion 114 via the protrusion portion 112 of the handrail member 111, with the handrail member 111 fixed at a predetermined turning angle outward in the vehicle width direction. Accordingly, in the present embodiment, the handrail member 111 is not supported in a cantilever manner.

In the present embodiment, therefore, there is less need to enhance the rigidity such that a root portion 111B side of the handrail member 111 that serves as a turning center of the handrail member 111 is supported in a cantilever manner with required rigidity, than in the case where the handrail member 14 is supported in a cantilever manner, as shown in FIG. 1. As a result, the cost can be reduced correspondingly.

Second Modification Example

Besides, in the foregoing embodiment, the handrail member 14 is provided on the quarter pillar 58 as shown in FIG. 7. As a matter of course, however, the handrail member 14 may be provided on the vehicle seat 11 (see FIG. 1).

Figure 12:
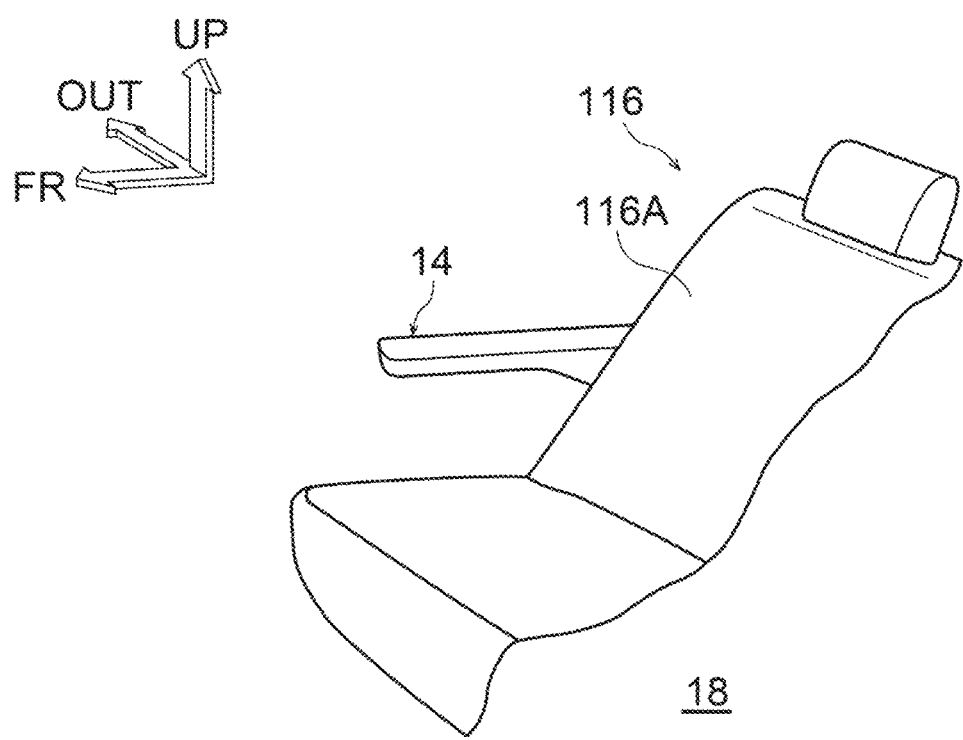
FIG. 12 is a perspective view of a handrail member, showing a second modification example of the handrail structure according to the first embodiment.

As the second modification example, for example, FIG. 12 is a perspective view of the outside of a vehicle seat 116 in the vehicle width direction. As shown in this drawing, the vehicle seat 116 is provided with a seatback 116A that supports the upper body of the passenger. The handrail member 14 may be provided on the seatback 116A.

In this manner, the passenger is allowed to smoothly get on or off the vehicle, by protruding the handrail member 14 more outward in the vehicle width direction than the vehicle cabin interior 18, with the sliding door (see FIG. 2) open, in the case where the handrail member 14 is provided on the seatback 116A. Incidentally, although not shown in the drawing, the handrail member 14 according to the present disclosure may be applied instead of the armrest that is provided in advance on the vehicle seat 116.

Third Modification Example

In the foregoing embodiment, the sliding door 30 that slides along the vehicle longitudinal direction has been described as the side door provided at the vehicle lateral portion 24, as shown in FIGS. 7 to 9, but the side door should not be limited thereto.

Figure 13:
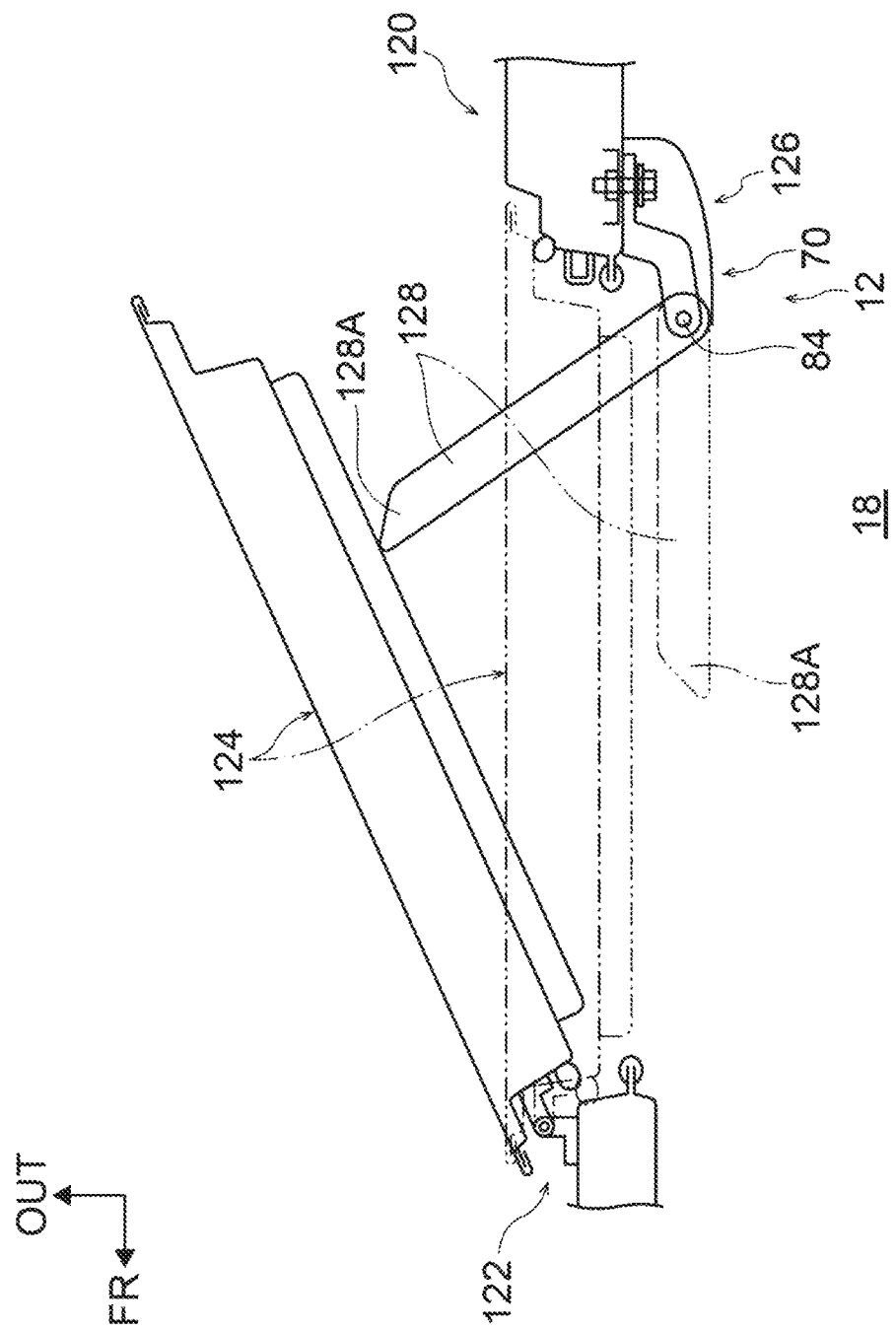
FIG. 13 is a cross-sectional view of a vehicle lateral portion taken along a horizontal direction with a swing-type side door open, showing a third modification example of the handrail structure according to the first embodiment.

As the third modification example, for example, FIG. 13 is a cross-sectional view of a handrail structure 126 applied to a side door 124, with a vehicle lateral portion 120 taken along the horizontal direction. As shown in this drawing, the handrail structure according to the present disclosure is also applicable to the so-called swing-type side door 124 that turns outward in the vehicle width direction around a door hinge 122 provided at the vehicle lateral portion 120.

As shown in FIG. 13, in the present embodiment, a handrail member 128 constituting part of the handrail structure 126 can be protruded outward in the vehicle width direction (as indicated by a solid line), or is arranged on the vehicle cabin interior 18 side (as indicated by an alternate long and two short dashes line), as the operation of opening or closing the side door 124 is performed.

Moreover, as indicated by the solid line, a tip portion (a free end portion) 128A of the handrail member 128 is arranged between the side door 124 and the vehicle lateral portion 120 in the vehicle width direction, with the side door 124 open. Besides, when the side door 124 is closed up, the tip portion 128A of the handrail member 128 is pushed by the side door 124, turns along the vehicle width direction around the bolt 84, and is arranged on the vehicle cabin interior 18 side as indicated by the alternate long and two short dashes line.

It should be noted herein that the side door 124 turns around the door hinge 122, and the handrail member 128 turns around the bolt 84, on the vehicle lateral portion 120 side, while the side door 124 and the handrail member 128 face each other along the vehicle longitudinal direction.

Therefore, for example, the tip of the handrail member 128 is corner-rounded as a cam surface, and is formed such that the turning movement of the side door 124 in a closing direction thereof can be converted into the turning movement of the handrail member 128 toward the vehicle cabin interior 18 side, when the side door 124 is closed up.

Fourth Modification Example

Furthermore, in the foregoing embodiment, the dimension of the handrail member 14 in the length direction thereof is determined as shown in FIG. 1, but an applicable embodiment of the present disclosure should not be limited thereto.

Figure 14:
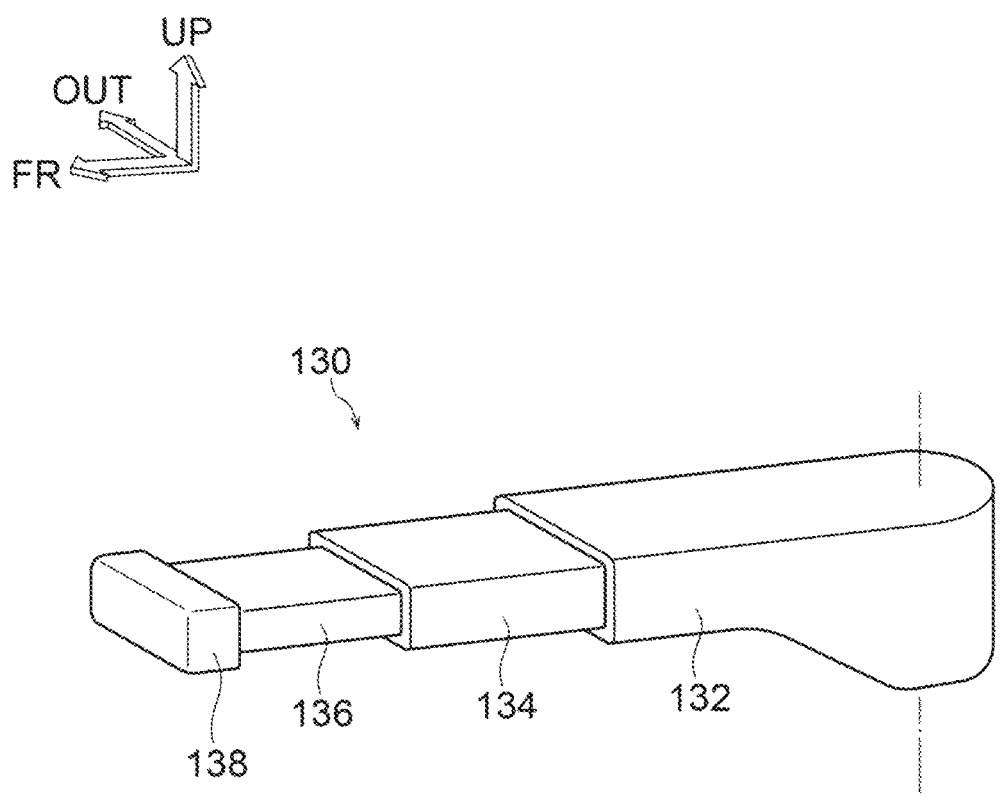
FIG. 14 is a perspective view of a handrail member, showing a fourth modification example of the handrail structure according to the first embodiment.

As the fourth modification example, for example, FIG. 14 is a perspective view of a handrail member 130. As shown in this drawing, the handrail member 130 may be formed in such a manner as to be elongatable along the length direction thereof.

In the present embodiment, which will be described concretely, the handrail member 130 is configured to include a main body portion 132, elongated portions 134 and 136, and a tip portion 138. The elongated portion 136 can be accommodated in the elongated portion 134. The elongated portions 134 and 136 can be accommodated in the main body portion 132.

On the other hand, the tip portion 138 is always exposed. The handrail member 130 is elongated by pulling the tip portion 138 along the length direction of the handrail member 130. Incidentally, the elongated portions 134 and 136 are provided with retaining portions (not shown) respectively.

For example, the elongated portion 136 is kept from falling off, through abutment of the retaining portion of the elongated portion 136 on a stopper (not shown) provided on the tip side of the elongated portion 134. The elongated portion 134 is elongated by further pulling the tip portion 138 in this state.

Besides, as is the case with the elongated portion 136, the elongated portion 134 is provided with the retaining portion (not shown). The elongated portion 134 is kept from falling off, through abutment of the retaining portion on a stopper (not shown) provided on the tip side of the main body portion 132.

In this manner, according to the present embodiment, the handrail member 130 is configured to be elongatable along the length direction thereof. Therefore, the length of the handrail member 130 can be adjusted depending on the sitting passenger, which is convenient.

Fifth Modification Example

Besides, the handrail member may have other functions as well.

Figure 15A:
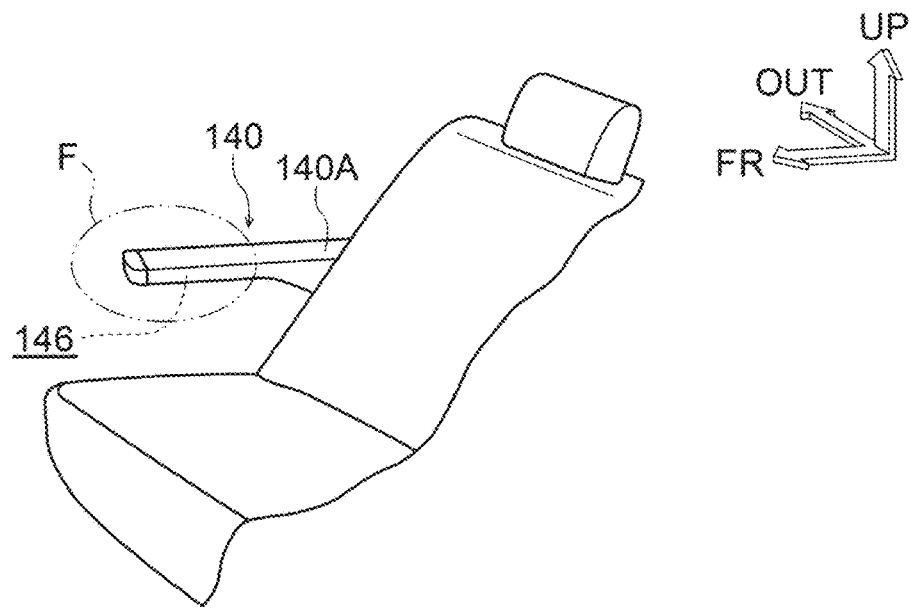
FIG. 15A is a perspective view showing part of a vehicle seat of a fifth modification example of the handrail structure according to the first embodiment.
Figure 15B:
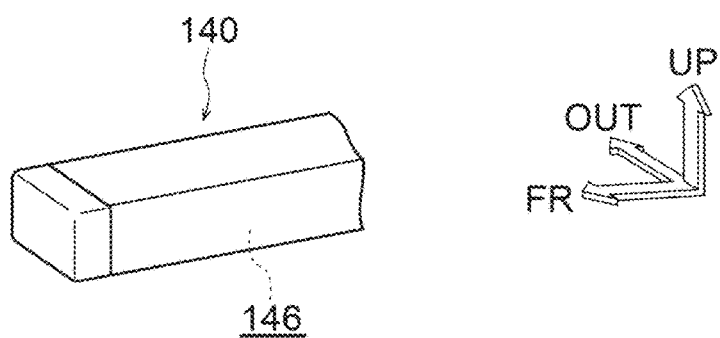
FIG. 15B is a partially enlarged perspective view of an F region shown in FIG. 15A on an enlarged scale.
Figure 15C:
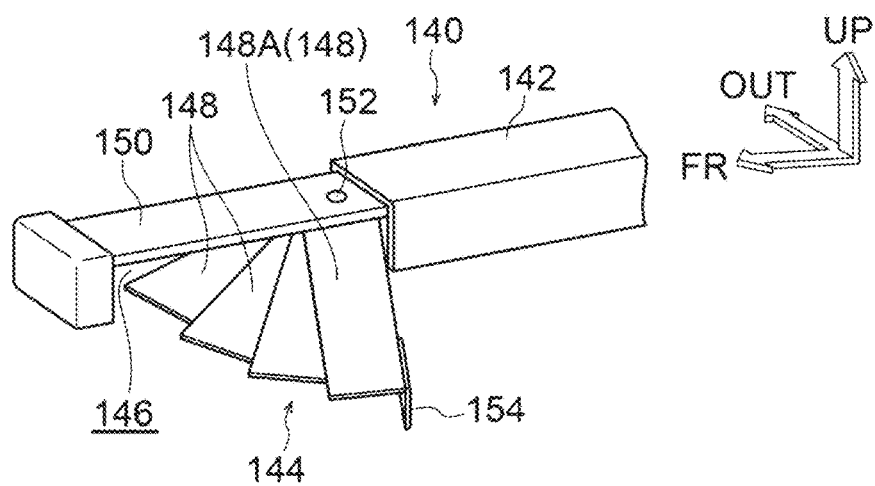
FIG. 15C is a partially enlarged perspective view showing a state where a foldable table of a handrail member is deployed.

As the fifth modification example, for example, FIG. 15A is a perspective view of a handrail member 140 provided with a foldable table 144 (see FIG. 15C). As shown in this drawing, the handrail member 140 may be provided with the foldable table 144.

Incidentally, FIG. 15B is a partially enlarged perspective view of an F region shown in FIG. 15A on an enlarged scale, and FIG. 15C is a perspective view showing a state where the foldable table 144 is deployed.

As shown in FIGS. 15A, 15B, and 15C, for example, a main body portion 142 of the handrail member 140 is provided with an accommodation portion 146 in which the table 144 can be accommodated. The table 144 is configured to include a plurality of plates 148, and is accommodated in the accommodation portion 146 in a vertically overlapping state, at a lower portion of a slider 150 that assumes the shape of a rectangular plate.

The slider 150 is provided with a shaft portion 152, on a root portion 140A side of the handrail member 140. The shaft portion 152 penetrates the plurality of the plates 148 to reach the root portion 140A side of the handrail member 140. The table 144 is deployed in a fan-shaped manner, through the turning of the plurality of the plates 148 around this shaft portion 152.

Incidentally, the plate 148A on the slider 150 side is provided with a hook portion 154 inside in the vehicle width direction. The foldable table 144 is deployed in a fan-shaped manner, by pulling the hook portion 154 inward in the vehicle width direction.

In this manner, according to the present embodiment, the handrail member 140 is provided with the accommodation portion 146, and the foldable table 144 is provided in such a manner as to be accommodatable in the accommodation portion 146. Thus, in addition to the function as the handrail member 140, the foldable table 144 can be produced from the accommodation portion 146 if necessary, which is convenient. Besides, the space of the accommodation portion 146 can be minimized, and as a result, the handrail member 140 can be made compact, by making the table 144 foldable.

Sixth Modification Example

Besides, as the sixth modification example, a handrail member 160 may be provided with a light-guiding member 161 in the present embodiment, as shown in FIGS. 16, 17A, 17B, and 17C.

Figure 16:
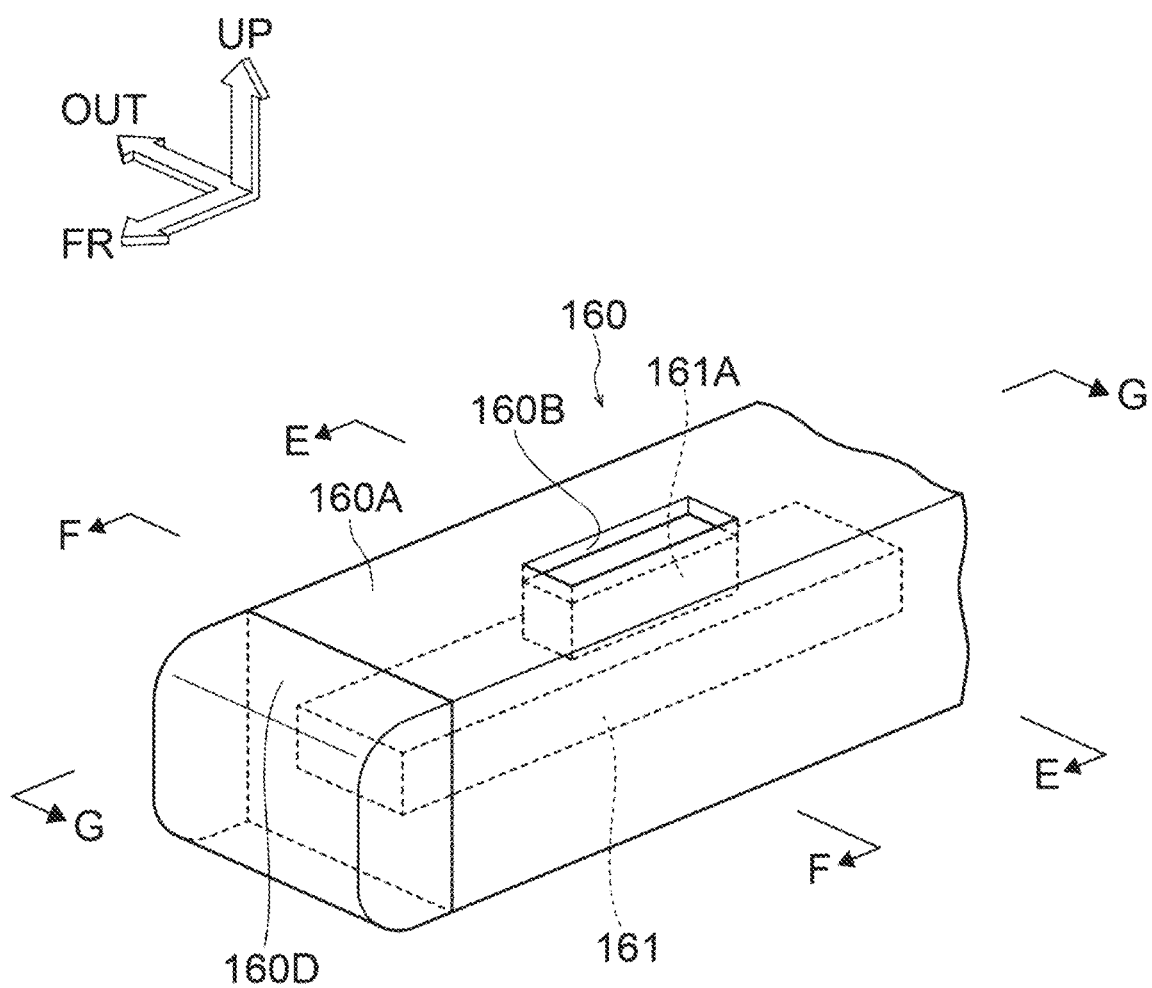
FIG. 16 is a perspective view of a handrail member, showing a sixth modification example of the handrail structure according to the first embodiment.
Figure 17A:
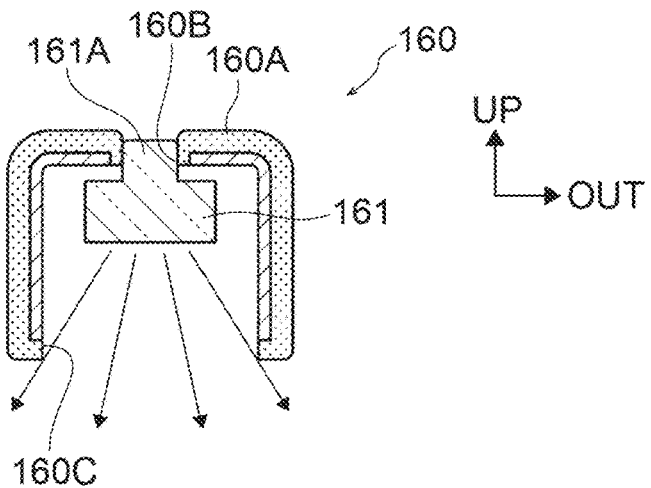
FIG. 17A is a cross-sectional view of the handrail member taken along a line E-E shown in FIG. 16.
Figure 17B:
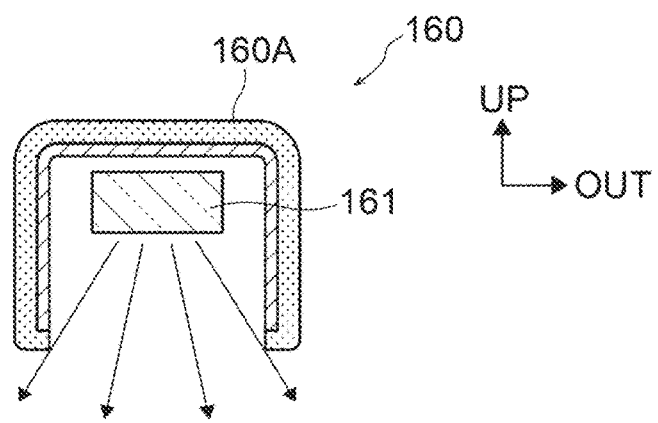
FIG. 17B is a cross-sectional view of the handrail member taken along a line F-F shown in FIG. 16.
Figure 17C:
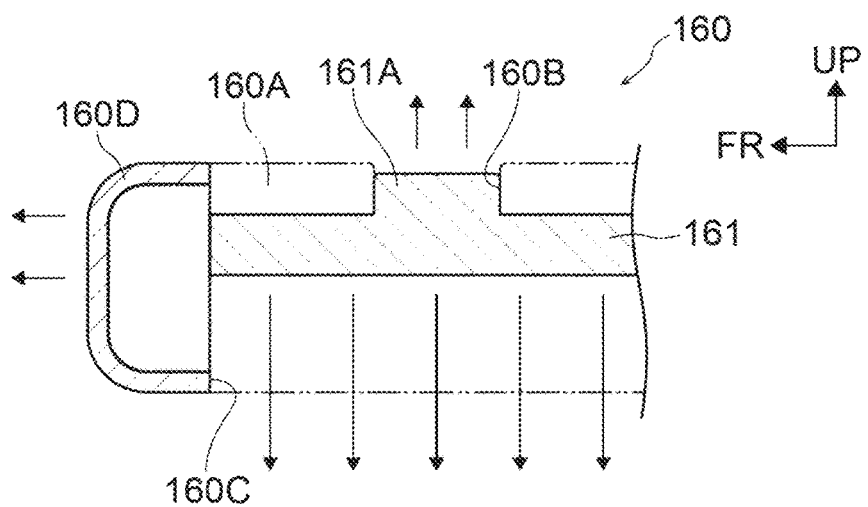
FIG. 17C is a cross-sectional view of the handrail member taken along a line G-G shown in FIG. 16.

FIG. 16 is a perspective view of the handrail member 160 provided with the light-guiding member 161. On the other hand, FIG. 17A is a cross-sectional view of the handrail member 160 taken along a line E-E shown in FIG. 16. Besides, FIG. 17B is a cross-sectional view of the handrail member 160 taken along a line F-F shown in FIG. 16. FIG. 17C is a cross-sectional view of the handrail member 160 taken along a line G-G shown in FIG. 16.

For example, the light-guiding member 161 is provided inside the handrail member 160, as shown in FIGS. 16, 17A, 17B, and 17C. Incidentally, the light-guiding member 161 is equipped with a light-emitting portion such as an LED (not shown) or the like, and is set such that the light-emitting portion can be energized as the operation of opening/closing the sliding door 30 is performed.

In the present embodiment, an opening portion 160B is provided through an upper portion 160A of the handrail member 160. An upper side of the handrail member 160 can be irradiated through light guiding by the light-guiding member 161, through the opening portion 160B.

Besides, the light-guiding member 161 is provided with a protrusion portion 161A, which is accommodated in the opening portion 160B of the handrail member 160. Thus, the light-guiding member 161 can be positioned in the vehicle width direction and the vehicle longitudinal direction with respect to the handrail member 160.

Furthermore, in the present embodiment, there is an opening 160C on a lower side of the handrail member 160. The lower side of the handrail member 160 can be irradiated through light guiding by the light-guiding member 161, through the opening 160C.

As described above, in the present embodiment, the position of the handrail member 160 can be confirmed through light guiding by the light-guiding member 161, when the passenger gets on or off the vehicle, by providing the handrail member 160 with the light-guiding member 161. Besides, the passenger is allowed to check where his or her feet are when getting on or off the vehicle, by irradiating the lower side of the handrail member 160 through light guiding by the light-guiding member 161.

Furthermore, it is appropriate to ensure that a tip portion 160D of the handrail member 160 can also be irradiated, as shown in FIG. 17C. Incidentally, in this case, since the light from the light-guiding member 161 needs to be transmitted through the tip portion 160D of the handrail member 160, a material exhibiting translucency such as polycarbonate or the like is used for the tip portion 160D of the handrail member 160. Alternatively, the handrail member 160 itself may be formed of a material exhibiting translucency. In this case, the opening portion 160B and the opening portion 160C are not absolutely indispensable.

Second Embodiment

Configuration of Handrail Structure

Figure 18:
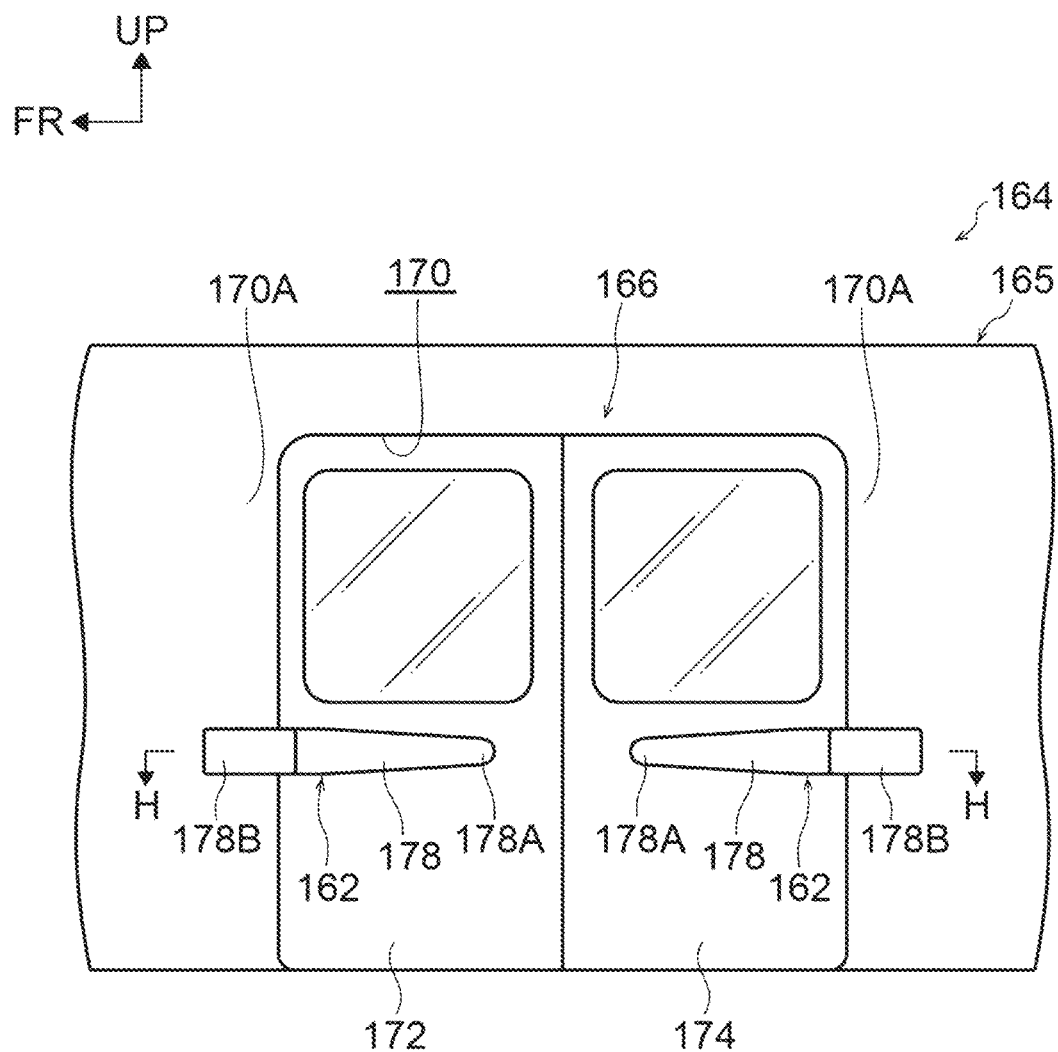
FIG. 18 is a front view of handrail members with opening/closing doors closed up, as viewed from a vehicle cabin interior side, in a train to which a handrail structure according to the second embodiment is applied.
Figure 19:
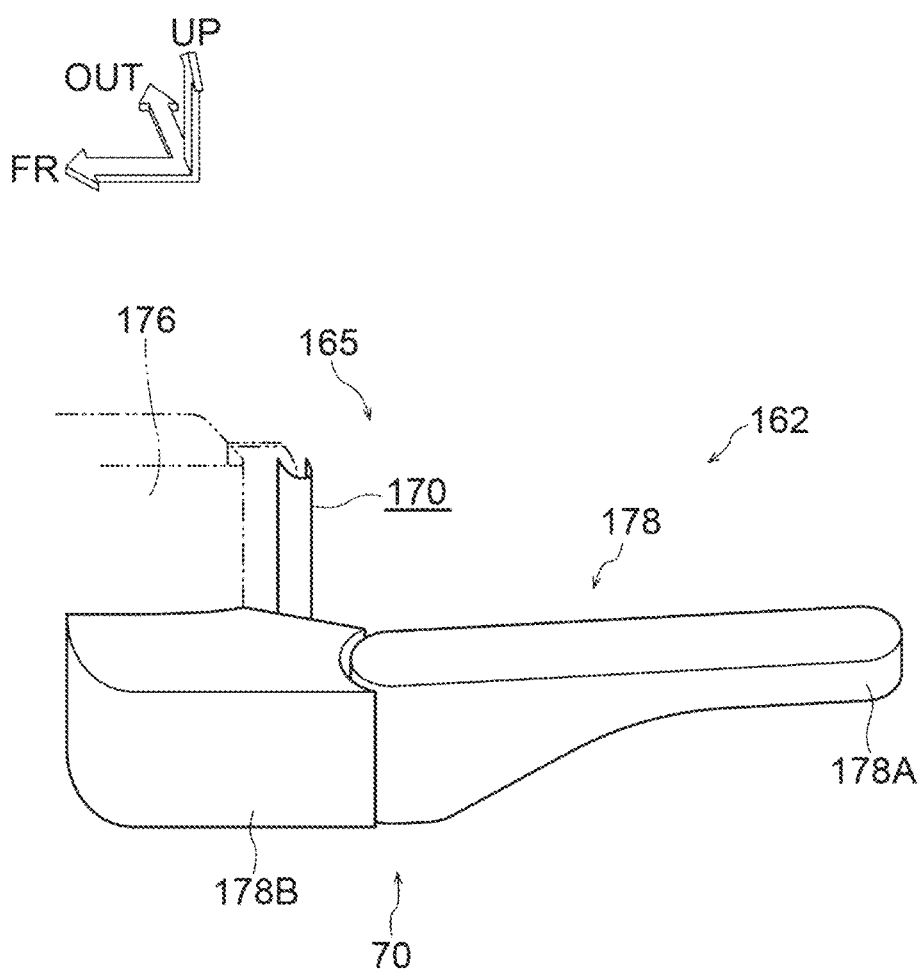
FIG. 19 is a perspective view of each of the handrail members to which the handrail structure according to the second embodiment is applied, as viewed from the vehicle cabin interior side.

In the foregoing first embodiment, the description has been given citing the automobile or the like as an example, but the present disclosure is also applicable to a vehicle other than the automobile, such as a bus, a train, or the like. In the second embodiment, therefore, a train (a vehicle) 164 equipped with handrail members 178 to which a handrail structure 162 according to the second embodiment is applied will be described, as shown in FIGS. 18 and 19. Incidentally, the handrail structure 162 is substantially the same as the handrail structure 12 (see FIG. 6), so the description thereof will be omitted.

FIG. 18 is a front view of a door portion 166 of the train 164 equipped with the handrail members 178, as viewed from a vehicle cabin interior 168 side. Besides, FIG. 19 is a perspective view of each of the handrail members 178 as viewed from the vehicle cabin interior 168 side.

As shown in FIG. 18, in this train 164, opening/closing doors 174 and 172 are provided on the right and left of an entrance 170 through which passengers get on/off the train, respectively. These opening/closing doors 172 and 174 are of a sliding type that slides along the vehicle longitudinal direction. The opening/closing doors 172 and 174 are substantially identical in basic configuration to the sliding door 30 (see FIG. 1) in the first embodiment. Therefore, those members of the opening/closing doors 172 and 174 which function in the same manner as the sliding door 30 are denoted by the same reference symbols respectively, and the description thereof will be omitted.

Besides, as shown in FIG. 18, at the door portion 166 provided at a vehicle lateral portion 165 of the train 164, the handrail members 178 are provided on the vehicle cabin interior 168 side (the vehicle lateral portion; see FIG. 20A) of lateral pillars 176 of the train 164 that are provided along the vehicle vertical direction, at peripheral portions 170A of the entrance 170 on the vehicle cabin interior 168 side, on the front and rear sides with respect to the vehicle respectively. That is, as shown in FIG. 20A, a root portion 178B of each of the handrail members 178 is attached to the corresponding one of the lateral pillars 176 of the train 164.

Figure 20A:
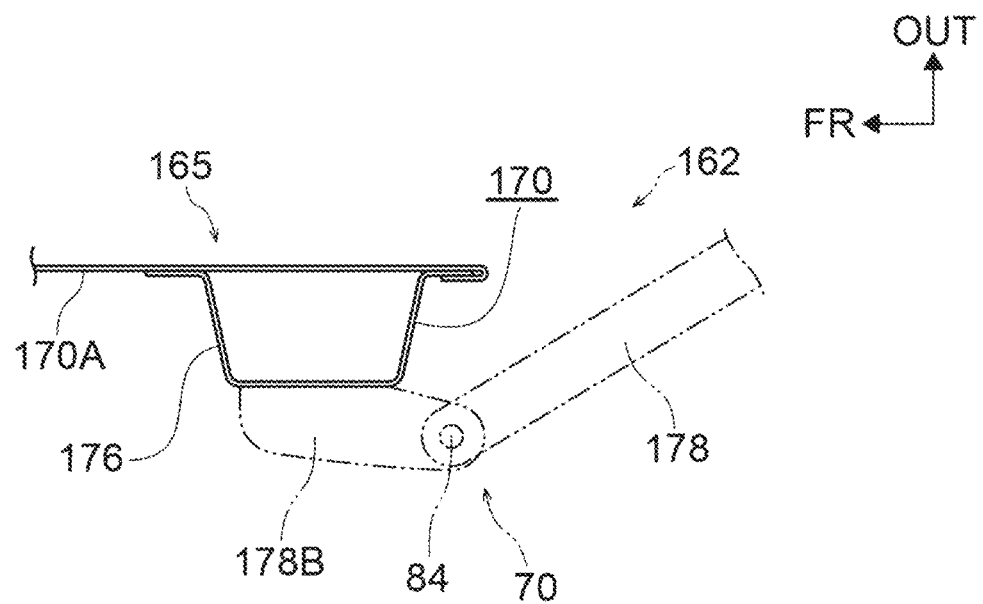
FIG. 20A is a cross-sectional view of a vehicle lateral portion taken along the horizontal direction, showing a state where each of the handrail members shown in FIG. 18 is provided on a lateral pillar.

Incidentally, FIG. 20A is a cross-sectional view of the vehicle lateral portion 165 with the peripheral portions 170A of the entrance 170 taken along the horizontal direction, showing a state where each of the handrail members 178 shown in FIG. 18 is provided on the corresponding one of the lateral pillars 176.

In the present embodiment, each of the handrail members 178 is provided with the torsion spring 100 (see FIG. 6). Therefore, as indicated by solid lines in FIG. 21, the handrail members 178 are arranged on the vehicle cabin interior 168 side along the vehicle longitudinal direction (the handrail members 178 are at reference positions thereof respectively), with the opening/closing doors 172 and 174 closed up, respectively.

Incidentally, FIG. 21 is a cross-sectional view of the vehicle lateral portion 165 taken along a line H-H shown in FIG. 18. The solid lines indicate a state where the opening/closing doors 172 and 174 are closed up, and alternate long and two short dashes lines indicate a state where the opening/closing doors 172 and 174 are open.

In the present embodiment, tip portions 178A of the handrail members 178 abut on door inner panels 172A and 174A of the opening/closing doors 172 and 174 respectively. In this state, elastic energy is accumulated in the torsion spring 100 (see FIG. 6) provided on each of the handrail members 178. Therefore, the handrail members 178 can remain urged toward the opening/closing door 172 and 174 sides respectively.

In this manner, according to the present embodiment, with the opening/closing doors 172 and 174 closed up, the handrail members 178 remain urged toward the opening/closing door 172 and 174 sides respectively, and hence can be used as handrails by passengers standing in the vehicle cabin interior 18. Incidentally, in the present embodiment, it is not absolutely necessary to provide lock devices for locking the handrail members 178 at reference positions thereof respectively.

On the other hand, when the opening/closing doors 172 and 174 are opened, the tip portion 178A of each of the handrail members 178 turns more outward in the vehicle width direction than the vehicle cabin interior 18, around the bolt 84, due to the urging force of the torsion spring 100. As a result, each of the handrail members 178 is arranged from the reference position thereof indicated by the solid line to the usable position thereof indicated by the alternate long and two short dashes line.

It should be noted herein that the tip portions 178A of the handrail members 178 protrude outside the opening/closing doors 172 and 174 in the vehicle width direction respectively, with the opening/closing doors 172 and 174 open, as indicated by the alternate long and two short dashes lines in FIG. 21. Thus, it is possible to help passengers placing their hands on the handrail members 178 get on/off the vehicle between the vehicle cabin interior 168 and a platform 180. Incidentally, as a matter of course, the tip portions 178A of the handrail members 178 may be set in such a manner as not to protrude outside the opening/closing doors 172 and 174 in the vehicle width direction respectively.

Besides, in the present embodiment, the example in which the root portion 178B of each of the handrail members 178 is attached to the corresponding one of the lateral pillars 176 as the vehicle lateral portion 165 on the vehicle cabin interior 168 side of the train 164 as shown in FIG. 20A has been described, but an applicable embodiment of the present disclosure should not be limited thereto.

Figure 20B:
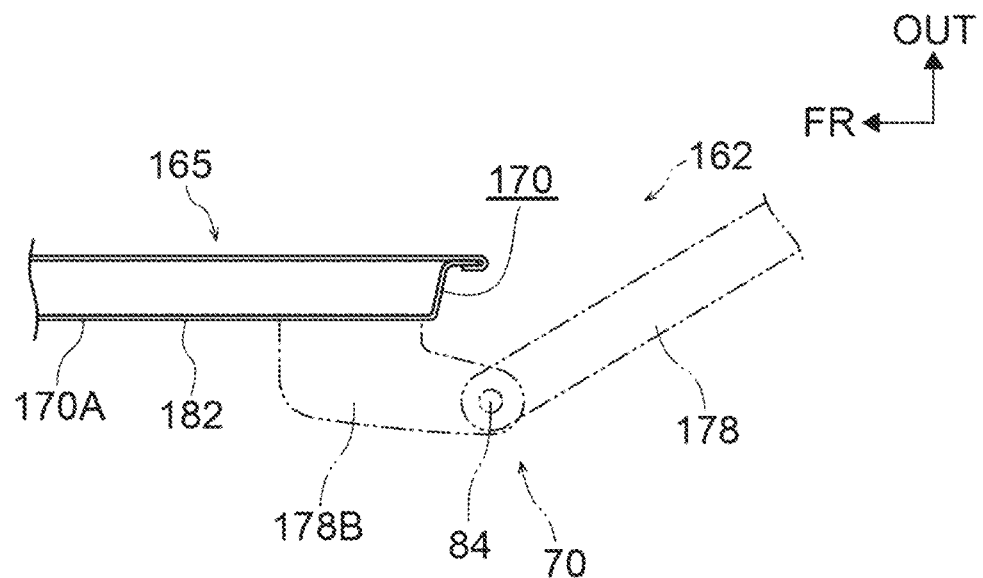
FIG. 20B is a cross-sectional view of a vehicle lateral portion showing a modification example of FIG. 20A.

For example, as shown in FIG. 20B, the root portion 178B of each of the handrail members 178 may be attached to the vehicle cabin interior 168 side of a lateral wall (a vehicle lateral portion) 182 provided at the peripheral portion 170A of the entrance 170 of the train 164.

Figure 22:
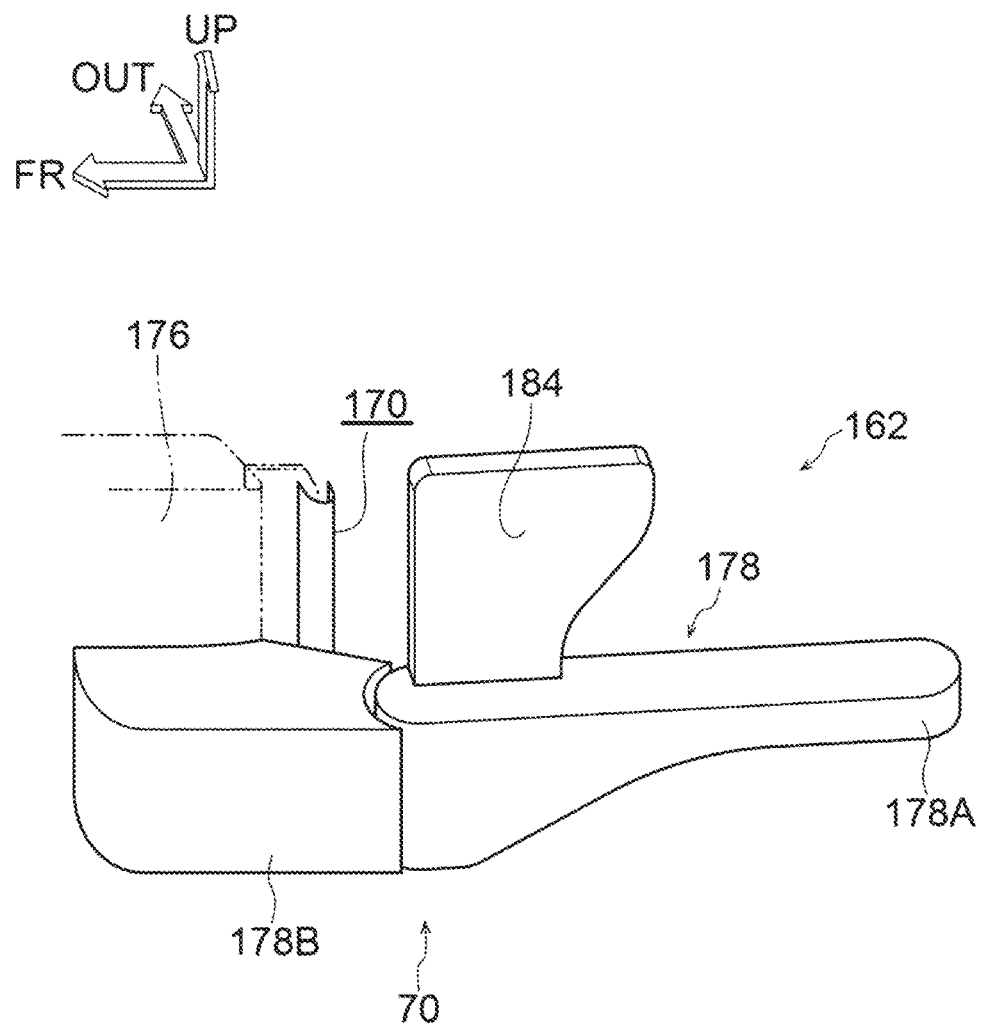
FIG. 22 is a perspective view corresponding to FIG. 19, showing a modification example of the handrail structure according to the second embodiment.
Figure 23:
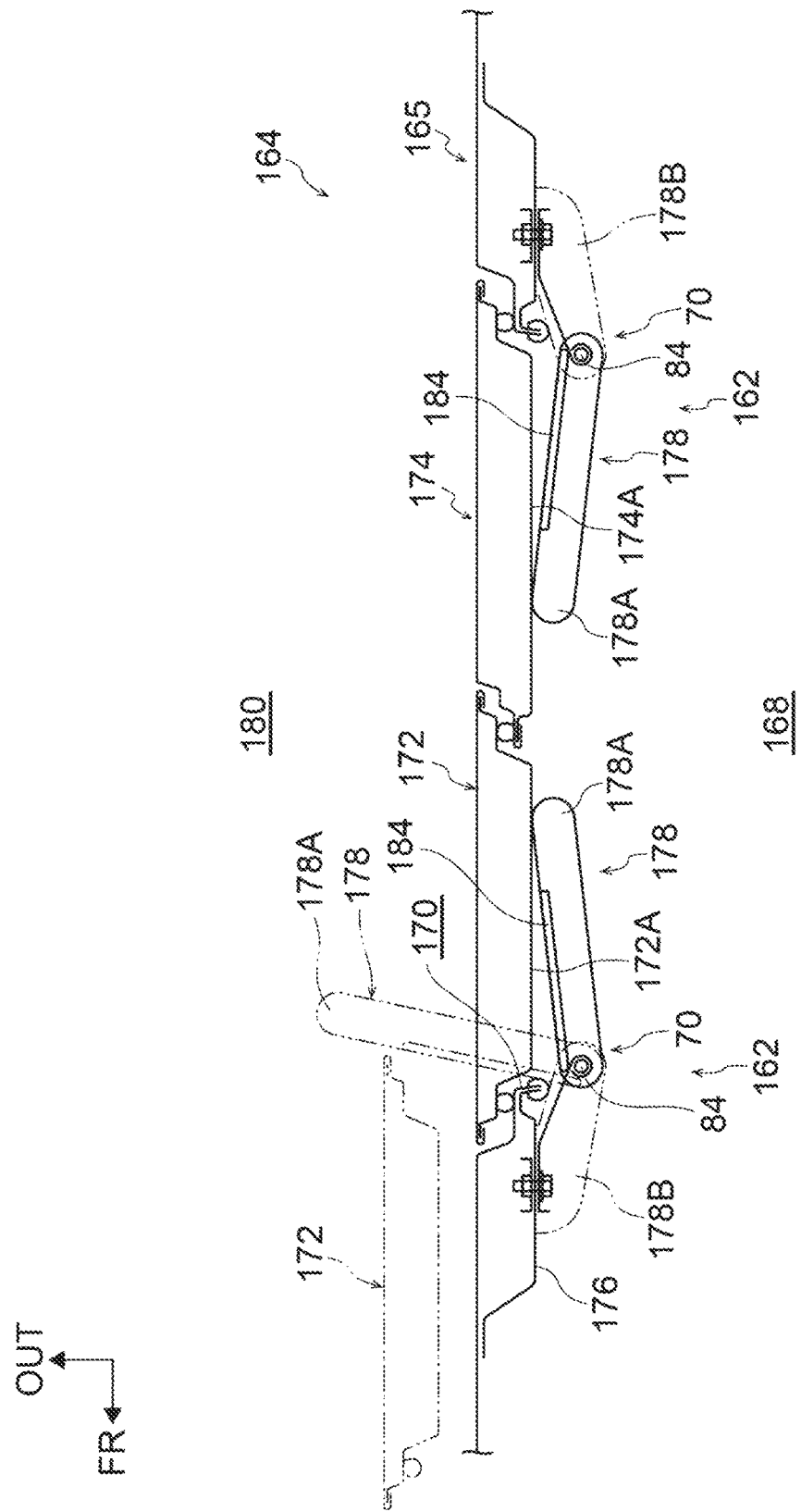
FIG. 23 is a cross-sectional view of the vehicle lateral portion corresponding to FIG. 21, showing the modification example of the handrail structure according to the second embodiment.

Besides, in the case where the handrail member 14 is applied to the train 164, it is better to attach a protection member 184 that covers the turning support portion 70 of each of the handrail members 178, as shown in FIGS. 22 and 23, as a modification example of the second embodiment. Thus, the hand of each passenger can be restrained from entering the turning support portion 70 side.

Incidentally, FIG. 22 is a perspective view corresponding to FIG. 19, showing the modification example of each of the handrail members 178. FIG. 23 is a cross-sectional view of the vehicle lateral portion 165 corresponding to FIG. 21, showing the modification example of the handrail structure 162 equipped with the handrail members 178.

Although the exemplary embodiments of the present disclosure have been described above, an applicable embodiment of the present disclosure should not be limited to the aforementioned embodiments thereof. As a matter of course, the embodiments and the various modification examples may be used in combination with one another as appropriate, and the present disclosure can be carried out in various aspects within such a range as not to depart from the gist thereof.

What is claimed is:

1. A handrail structure, comprising:
   a handrail member that is provided along a vehicle longitudinal direction of a vehicle, on a vehicle cabin interior side of a vehicle lateral portion or on a vehicle seat, a side door being provided at the vehicle lateral portion and arranged, in an open state thereof, more outward in a vehicle width direction than the vehicle lateral portion; and
   a turning support portion that turnably supports the handrail member in such a direction as to protrude outward in the vehicle width direction,
   wherein
   the turning support portion is configured to
      in response to the side door being closed up, turn the handrail member, which is pushed by the side door, toward the vehicle cabin interior side, and
      in response to the side door being open, turn the handrail member in such a direction that a free end portion of the handrail member protrudes more outward in the vehicle width direction than a vehicle cabin through an opening that is openable and closable by the side door and is configured to permit a passenger to enter and exit the vehicle, and
   the turning support portion is configured to turn the handrail member from a first position where the free end portion of the handrail member abuts on a door trim of the side door to a second position where the free end portion of the handrail member abuts on an inner panel of the side door.

2. The handrail structure according to claim 1, wherein the turning support portion is provided with an urging member that urges the handrail member outward in the vehicle width direction.

3. The handrail structure according to claim 1, wherein the handrail member is configured to serve as an armrest adapted to support an elbow of a sitting passenger who sits in the vehicle seat when the side door is closed up.

4. The handrail structure according to claim 1, wherein the free end portion of the handrail member is arranged between the side door and the vehicle lateral portion in the vehicle width direction, when the side door is open and the free end portion of the handrail member protrudes more outward in the vehicle width direction than the vehicle cabin.

5. The handrail structure according to claim 1, wherein the handrail member is configured to turn along a horizontal direction around the turning support portion.

6. The handrail structure according to claim 1, wherein the side door includes a support portion, and the free end portion of the handrail member is configured to be supported by the support portion when the side door is open and the handrail member protrudes outward in the vehicle width direction.

7. The handrail structure according to claim 1, wherein the side door includes a recess portion that is recessed outward in the vehicle width direction, and when the side door is closed up, the free end portion of the handrail member is received in the recess portion, and the free end portion of the handrail member is prevented by the recess portion from moving in a vehicle vertical direction.

8. The handrail structure according to claim 1, wherein the handrail member is further equipped with an elongated portion that is adjustably extendible along a length direction of the handrail member.

9. The handrail structure according to claim 1, wherein the handrail member further includes an accommodation portion configured to accommodate a foldable table.

10. The handrail structure according to claim 1, wherein the handrail member is provided with a light-guiding member configured to radiate light through light guiding.

11. The handrail structure according to claim 1, wherein the turning support portion has a turning axis about which the handrail member is turnable, the turning axis being positioned on the vehicle cabin interior side of the vehicle lateral portion.

12. The handrail structure according to claim 1, wherein the handrail member is provided on the vehicle seat in the vehicle cabin.

13. The handrail structure according to claim 1, wherein the handrail member is provided on the vehicle cabin interior side of the vehicle lateral portion in the vehicle cabin.

14. The handrail structure according to claim 1, wherein the free end portion of the handrail member includes a bent portion that is configured to face toward a lateral wall portion of the side door when the side door is open and the handrail member protrudes outward in the vehicle width direction.

15. The handrail structure according to claim 14, wherein the lateral wall portion of the side door includes a support portion, and the free end portion of the handrail member is configured to be supported by the support portion when the side door is open and the handrail member protrudes outward in the vehicle width direction.

* * * * *